United States Patent
Drabek et al.

(10) Patent No.: US 11,554,334 B2
(45) Date of Patent: Jan. 17, 2023

(54) AIR CLEANER

(71) Applicant: Cummins Power Generation IP, Inc., Minneapolis, MN (US)

(72) Inventors: Hans L. Drabek, Woodbury, MN (US); Anthony T. Klejeski, Bethel, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 431 days.

(21) Appl. No.: 16/697,089

(22) Filed: Nov. 26, 2019

(65) Prior Publication Data

US 2020/0164298 A1 May 28, 2020

Related U.S. Application Data

(60) Provisional application No. 62/771,939, filed on Nov. 27, 2018.

(51) Int. Cl.
| | |
|---|---|
| *B01D 46/00* | (2022.01) |
| *B01D 46/10* | (2006.01) |
| *H02K 7/18* | (2006.01) |
| *H02K 11/04* | (2016.01) |
| *H02K 9/26* | (2006.01) |

(52) U.S. Cl.
CPC ..... *B01D 46/0005* (2013.01); *B01D 46/0004* (2013.01); *B01D 46/10* (2013.01); *H02K 7/1815* (2013.01); *H02K 9/26* (2013.01); *H02K 11/046* (2013.01); *B01D 2265/025* (2013.01); *B01D 2265/028* (2013.01); *B01D 2271/02* (2013.01); *B01D 2279/60* (2013.01)

(58) Field of Classification Search
CPC ............ B01D 46/0004; B01D 46/0005; B01D 46/10; B01D 2265/025; B01D 2265/028; B01D 2271/02; B01D 2279/60
USPC ... 55/385.3, 428, 337, 432, 459.1, 503, 505; 95/268, 273; 96/380; 123/198 E
See application file for complete search history.

(56) References Cited

U.S. PATENT DOCUMENTS

| | | |
|---|---|---|
| D309,288 S | 7/1990 | Haverly |
| D344,711 S | 3/1994 | Clancey et al. |
| (Continued) | | |

OTHER PUBLICATIONS

Notice of Allowance on US Design U.S. Appl. No. 29/714,927, dated Dec. 14, 2020, 7 pages.
(Continued)

*Primary Examiner* — Minh Chau T Pham
(74) *Attorney, Agent, or Firm* — Foley & Lardner LLP

(57) ABSTRACT

Systems and apparatuses include a generator set including a chassis, an engine mounted to the chassis, an inverter coupled to the engine, and a housing coupled to the chassis. The engine and inverter are contained within the chassis and the housing. An air cleaner is sized to fit within the housing and includes an air cleaner housing defining an inlet and an outlet, and a sealing surface positioned between the inlet and the outlet, and a cover pivotably coupled to the air cleaner housing and including a carrier sized to be received within the air cleaner housing. The cover includes an air filter receiving feature structured to support an air filter and position the air filter between the inlet and the outlet, and a carrier flange structured to seal a portion of the air filter between the sealing surface and the carrier flange when the cover is arranged in a closed position.

20 Claims, 38 Drawing Sheets

(56) References Cited

U.S. PATENT DOCUMENTS

| | | | | |
|---|---|---|---|---|
| 5,730,768 A * | 3/1998 | Kaminaga | ........ | F02M 35/02491 55/502 |
| 6,039,009 A | 3/2000 | Hirose | | |
| D562,238 S | 2/2008 | Nozaki et al. | | |
| D574,771 S | 8/2008 | Flanigan | | |
| 7,655,074 B2 | 2/2010 | Nepsund et al. | | |
| D646,634 S | 10/2011 | Kipka | | |
| 8,298,308 B2 * | 10/2012 | Li | ........................ | F02M 35/024 55/480 |
| 8,377,161 B2 * | 2/2013 | Lee | .................... | F02M 35/0204 55/385.3 |
| 8,394,158 B2 * | 3/2013 | Shimomura | ....... | F02M 35/0203 55/495 |
| 8,562,726 B2 * | 10/2013 | Jun | .................. | F02M 35/02491 55/420 |
| 8,784,527 B2 * | 7/2014 | Jung | .................. | F02M 35/0209 55/497 |
| D711,825 S | 8/2014 | Wilson et al. | | |
| 8,808,432 B2 * | 8/2014 | Rotter | ................ | B01D 46/2411 96/380 |
| 2002/0069625 A1 * | 6/2002 | Stass | ...................... | B01D 46/10 55/497 |
| 2003/0126841 A1 * | 7/2003 | Pettipiece | .......... | B01D 46/4236 96/380 |
| 2009/0126678 A1 * | 5/2009 | Takeuchi | ........... | F02M 35/1017 55/385.3 |
| 2012/0073252 A1 * | 3/2012 | Lee | .................. | F02M 35/02491 55/385.3 |
| 2012/0192535 A1 * | 8/2012 | Schrewe | .............. | B01D 46/521 16/382 |
| 2013/0139483 A1 * | 6/2013 | Jung | ................ | F02M 35/02416 55/480 |

OTHER PUBLICATIONS

U.S. Appl. No. 29/714,927, filed Nov. 26, 2019, Cummins Power Generation IP, Inc.

* cited by examiner

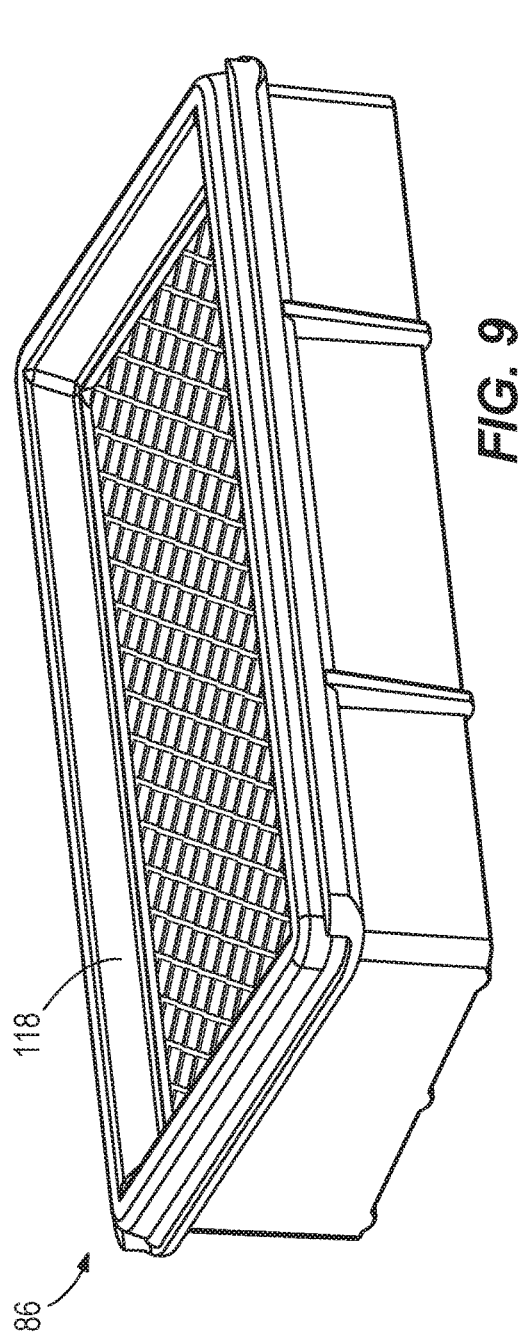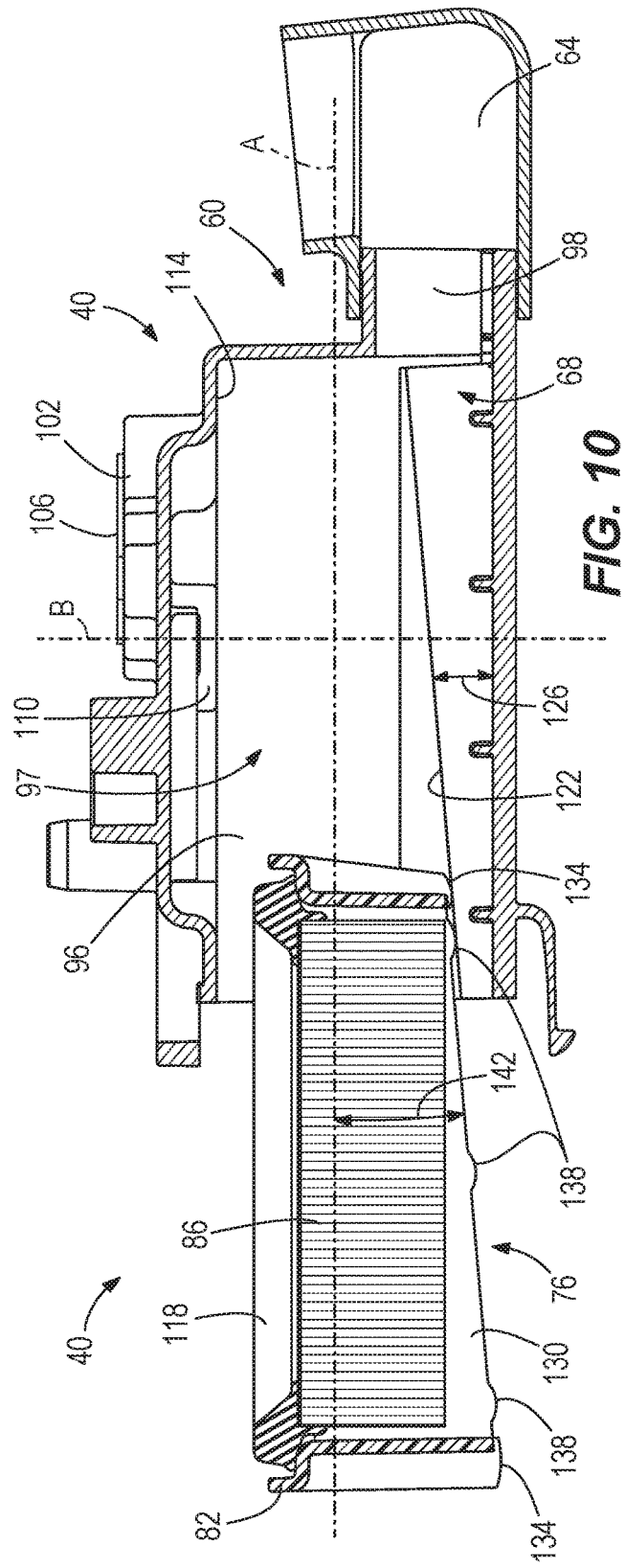

AIR CLEANER

This application claims the benefit of U.S. Provisional Patent Application No. 62/771,939 filed on Nov. 27, 2018, the entire contents of which are incorporated herein by reference.

TECHNICAL FIELD

Technical Field

The present disclosure relates to air cleaners for engines. More particularly, according to some embodiments, the present disclosure relates to systems and methods for air cleaners with replaceable air filters for generator sets including internal combustion engines.

Background

Air cleaner systems for generator sets that utilize a panel type air filter element include a housing and a removable door. The door typically includes clips that engage tabs on the housing allowing access to an interior of the housing. With the door removed, an air filter element can be installed into the housing in a sealing arrangement and the door replaced to seal the air cleaner system. In other generator sets, the removable door may be hinged to the housing. In compact generator sets, a typical removable or hinged door arrangement may not possible due to space constraints.

SUMMARY

One embodiment relates to an apparatus that includes a housing including an inlet, an outlet structured to couple to an engine, a housing cavity between the inlet and the outlet, a housing cam, and a selectively sealable filter opening. A carrier is sized to be received within the housing cavity and includes a carrier cam structured to interact with the housing cam so that insertion of the carrier into the housing in a first direction results in movement of the carrier in a second direction transverse to the first direction, the carrier structured to support a filter element and to seal the filter element between the inlet and the outlet via the movement in the second direction.

Another embodiment relates to a system that includes a housing defining an inlet and an outlet, a ramp positioned within the housing, and a carrier sized to be received within the housing. The carrier includes an air filter receiving feature structured to support an air filter and position the air filter between the inlet and the outlet, and a follower feature arranged to engage the ramp so that insertion of the carrier into the housing results in movement of the air filter receiving feature toward the outlet.

Another embodiment relates to a generator set that includes a chassis, an engine mounted to the chassis, an inverter coupled to the engine, a housing coupled to the chassis, the engine and inverter contained within the chassis and the housing, and an air cleaner sized to fit within the housing. The air cleaner includes an air cleaner housing defining an inlet and an outlet coupled to the engine, a ramp positioned within the air cleaner housing, and an air cleaner carrier sized to be received within the air cleaner housing. The air cleaner carrier includes an air filter receiving feature structured to support an air filter including a gasket, and a follower feature arranged to engage the ramp so that insertion of the carrier into the air cleaner housing results in movement of the air filter receiving feature toward the outlet so that the gasket of the air filter sealingly engages the outlet so that air flows from the inlet, through the air filter, and to the outlet.

Another embodiment relates to a system that includes a housing including an inlet, an outlet structured to couple to an engine, and a sealing seat positioned between the inlet and the outlet. A carrier is selectively coupled to the housing and includes a carrier flange structured to support a filter element. The carrier is movable between a first position where the carrier flange is positioned adjacent the sealing seat so that the filter element is sealed therebetween air flow between the inlet and the outlet passes through the filter element, and a second position where the carrier flange is spaced from the sealing seat allowing the filter element to be removed.

Another embodiment relates to a housing that defines an inlet and an outlet, and a sealing surface positioned between the inlet and the outlet. A cover is pivotably coupled to the housing and includes a carrier sized to be received within the housing. The carrier includes an air filter receiving feature structured to support an air filter and position the air filter between the inlet and the outlet, and a carrier flange structured to seal a portion of the air filter between the sealing surface and the carrier flange when the cover is arranged in a closed position.

Another embodiment relates to a generator set including a chassis, an engine mounted to the chassis, an inverter coupled to the engine, and a housing coupled to the chassis. The engine and inverter are contained within the chassis and the housing. An air cleaner is sized to fit within the housing and includes an air cleaner housing defining an inlet and an outlet, and a sealing surface positioned between the inlet and the outlet, and a cover pivotably coupled to the air cleaner housing and including a carrier sized to be received within the air cleaner housing. The cover includes an air filter receiving feature structured to support an air filter and position the air filter between the inlet and the outlet, and a carrier flange structured to seal a portion of the air filter between the sealing surface and the carrier flange when the cover is arranged in a closed position.

These and other features, together with the organization and manner of operation thereof, will become apparent from the following detailed description when taken in conjunction with the accompanying drawings.

BRIEF DESCRIPTION OF THE FIGURES

FIG. 9 is a perspective view of an air filter of the air cleaner system of FIG. 6.

FIG. 10 is a section view of the air cleaner system in a first position taken along line 10-10 of FIG. 6.

DETAILED DESCRIPTION

Following below are more detailed descriptions of various concepts related to, and implementations of, methods, apparatuses, and systems for an air cleaner system for a compact generator set. The various concepts introduced above and discussed in greater detail below may be implemented in any number of ways, as the concepts described are not limited to any particular manner of implementation. Examples of specific implementations and applications are provided primarily for illustrative purposes.

Referring to the figures generally, the various embodiments disclosed herein relate to systems, apparatuses, and methods for an air cleaner system that provides cleaner air to an engine. A small footprint generator set includes a chassis, an engine and alternator coupled to the chassis, and housing that surrounds the engine and the alternator. An air cleaner assembly is positioned within the housing and includes an air cleaner housing and a door that is removable from the air cleaner housing. The air cleaner housing includes an inlet, an outlet coupled to the engine, and a ramped surface. An air filter carrier supports an air filter and is linearly insertable into the air cleaner housing so that the ramp forces a gasket of the air filter into a sealing relationship with the outlet. The ramp allows the air filter carrier to be inserted into the air cleaner housing linearly in a first direction and moves the air filter carrier in a second direction, different from the first direction in order to compress the gasket of the air filter as seal the air filter with relation to the outlet.

Figure 1:
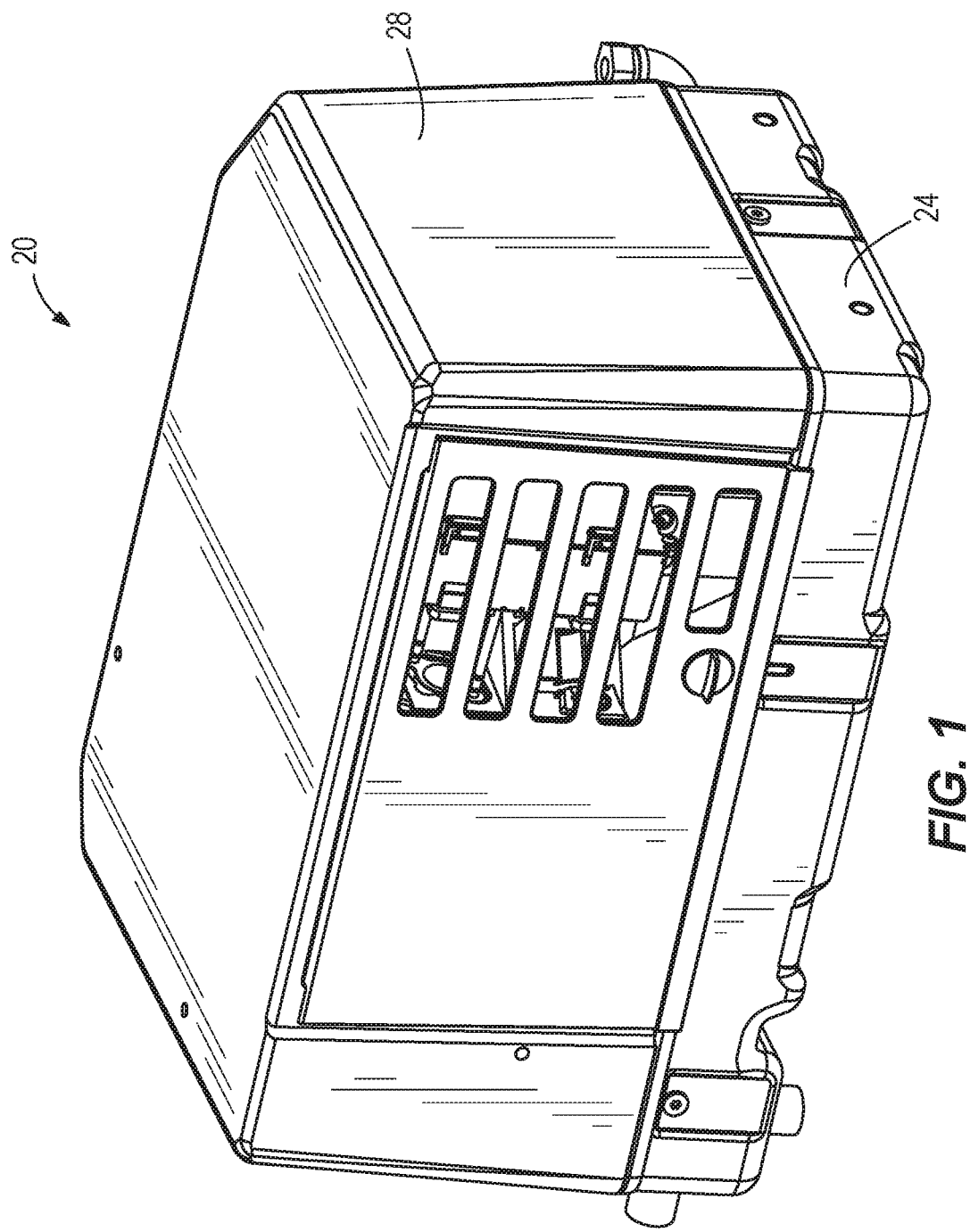
FIG. 1 is a perspective view of a generator set according to some embodiments.

As shown in FIG. 1, a generator set 20 includes a chassis 24 and a genset housing 28 fastened to the chassis 24. In some embodiments, the generator set 20 outputs under three kilowatts (3 kW) of power. In some embodiments, the generator set 20 is arranged to provide power to a class B type motorhome. It is desirable for these types of generator sets to be compact with a small footprint. The genset housing 28 can include intake, exhaust, and user interface features. For example, openings or access panels may be provided that allow a user to connect powered electronics, add fuel, or service components of the generator set 20. In some embodiments, the genset housing 28 is constructed of a molded plastic and includes heat resistant panels in strategic locations for heat management.

Figure 2:
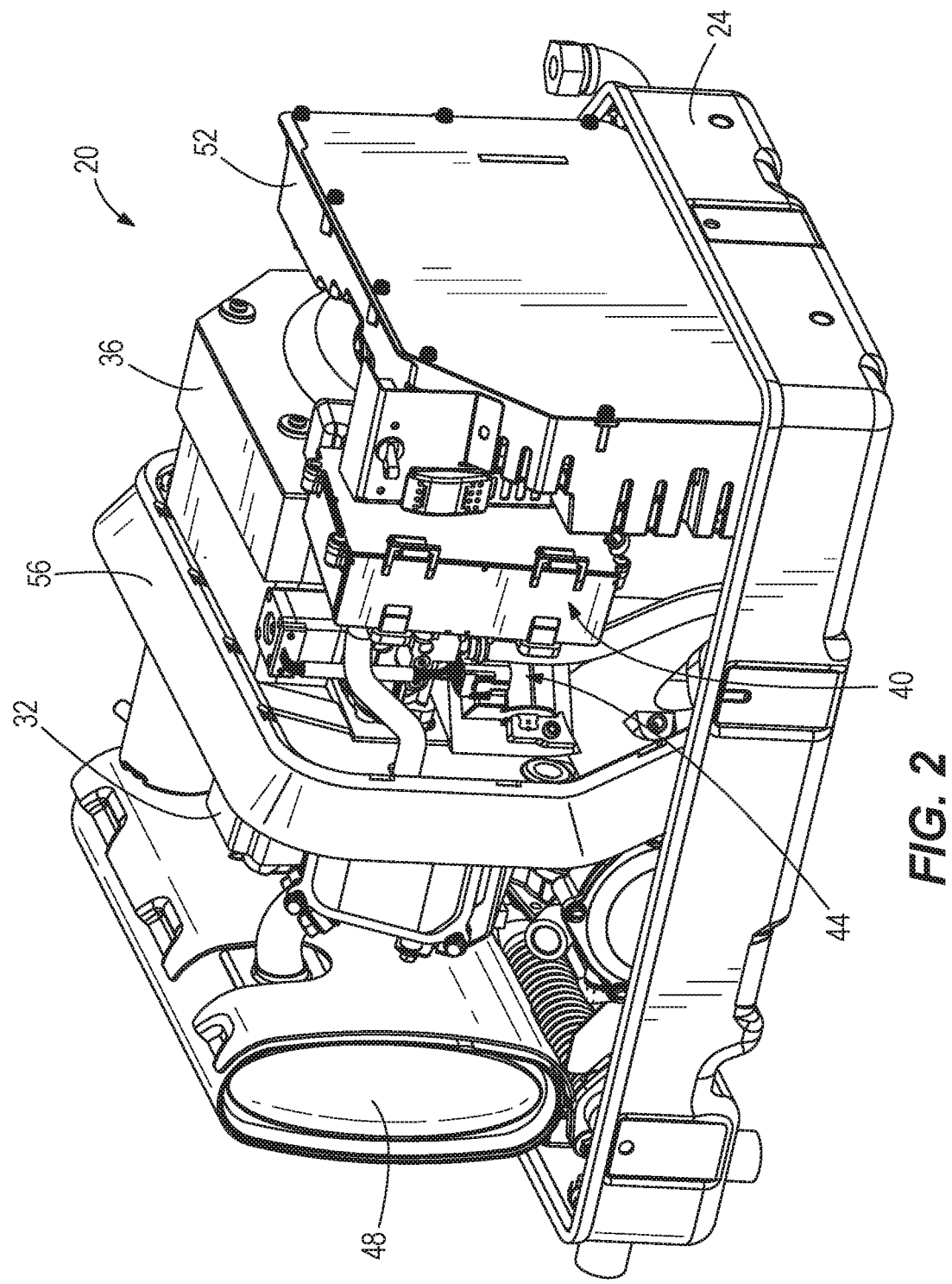
FIG. 2 is a perspective view of the generator set of FIG. 1 with a housing removed.

As shown in FIG. 2, an engine 32 is mounted to the chassis 24, and an alternator 36 is coupled to the engine 32. The engine 32 includes an air cleaner system 40, a fuel management system 44 (e.g., a fuel tank, a carburetor, an electronic fuel injection system, a fuel pump, etc.), and an after treatment system 48 (e.g., a muffler). In some embodiments, the engine is a gasoline engine with a carburetor that is fluidly coupled to a vehicle fuel tank located remotely from the generator set 20. In some embodiments, the engine 32 provides a variable speed output (e.g., between 2400 and 2900 rpm). In some embodiments, the engine 32 defines a displacement of about 252 cubic centimeters.

The alternator 36 is coupled to the engine 32 to convert a mechanical output form the engine 32 into electrical output usable by electrical systems coupled to the generator set 20 (e.g., via a user interface provided on the genset chassis 24). In some embodiments, the alternator 36 is a permanent magnet type alternator. In some embodiments, the alternator 36 includes an inverter for providing alternating current power, direct current power, or a combination of both. The generator set 20 also includes a control unit 52 structured to control operation of the alternator 36 and the engine 32. The control unit 52 can include an engine control unit structured to control aspects of combustion within the engine 32 (e.g., spark timing, fuel mixture, etc.) and aftertreatment (e.g., control exhaust gas recirculation, control a selective catalytic reduction system, monitor particulate filters, etc.). The control unit 52 can also control output parameters of the alternator 36 or control a battery system structured to provide the end user with desirable electrical output. In some embodiments, a heat shield 56 is positioned between a hot side of the generator set 20 and a cool side of the generator set 20 to reduce the impact of heat generated by the engine 32 on the electrical components.

Figure 3:
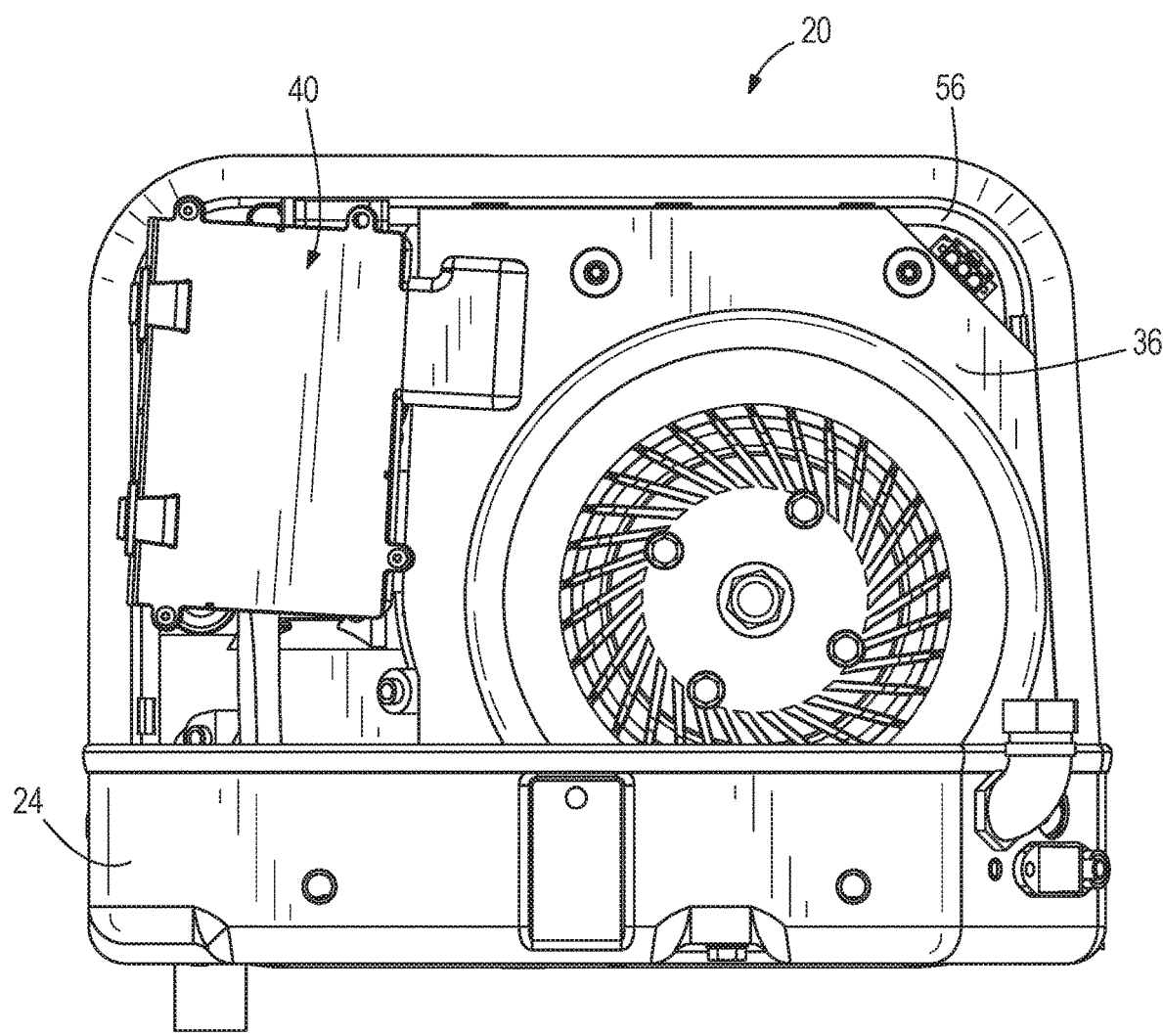
FIG. 3 is a right side view of the generator set of FIG. 2 with an electronics panel removed.
Figure 4:
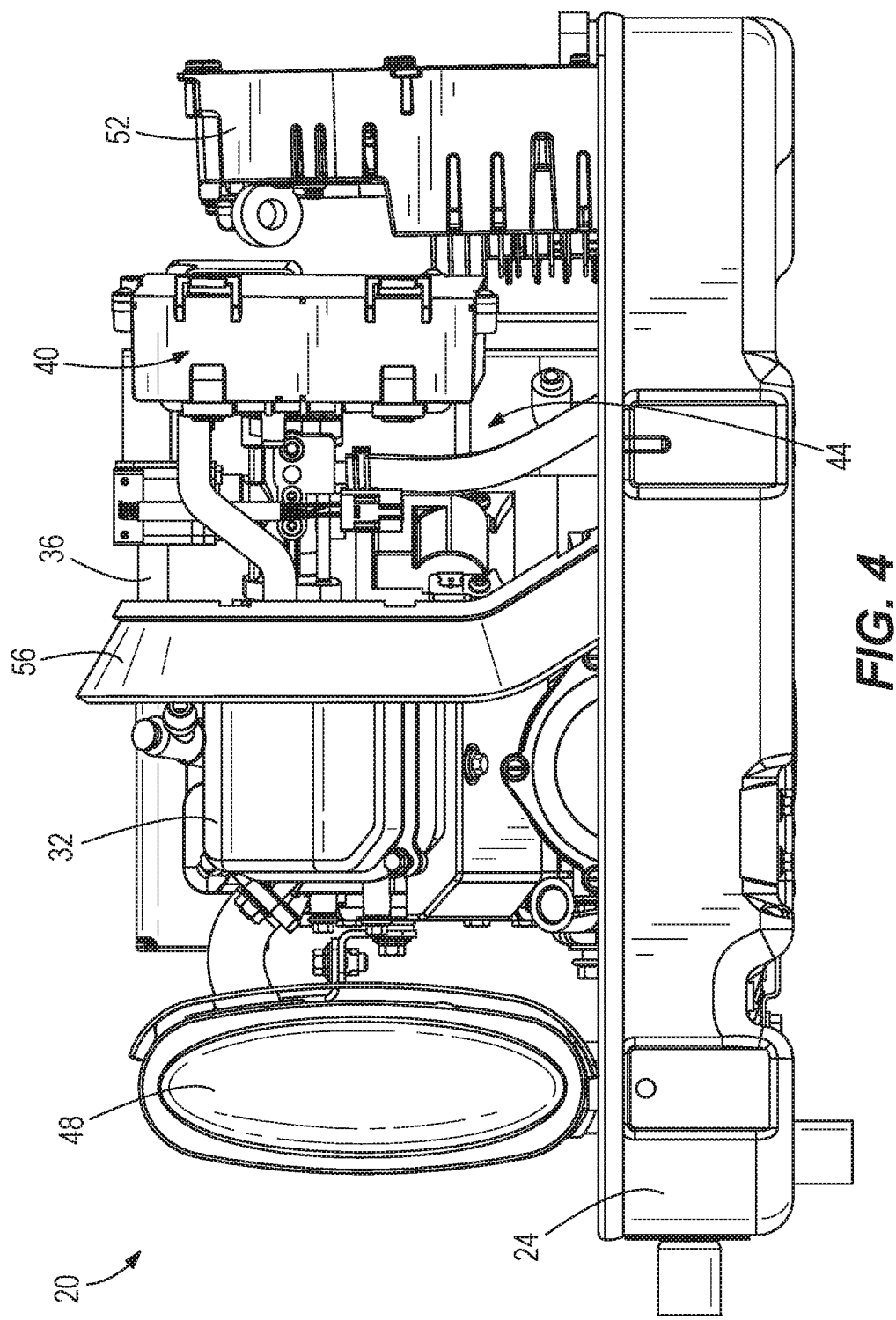
FIG. 4 is a front view of the generator set of FIG. 2.
Figure 5:
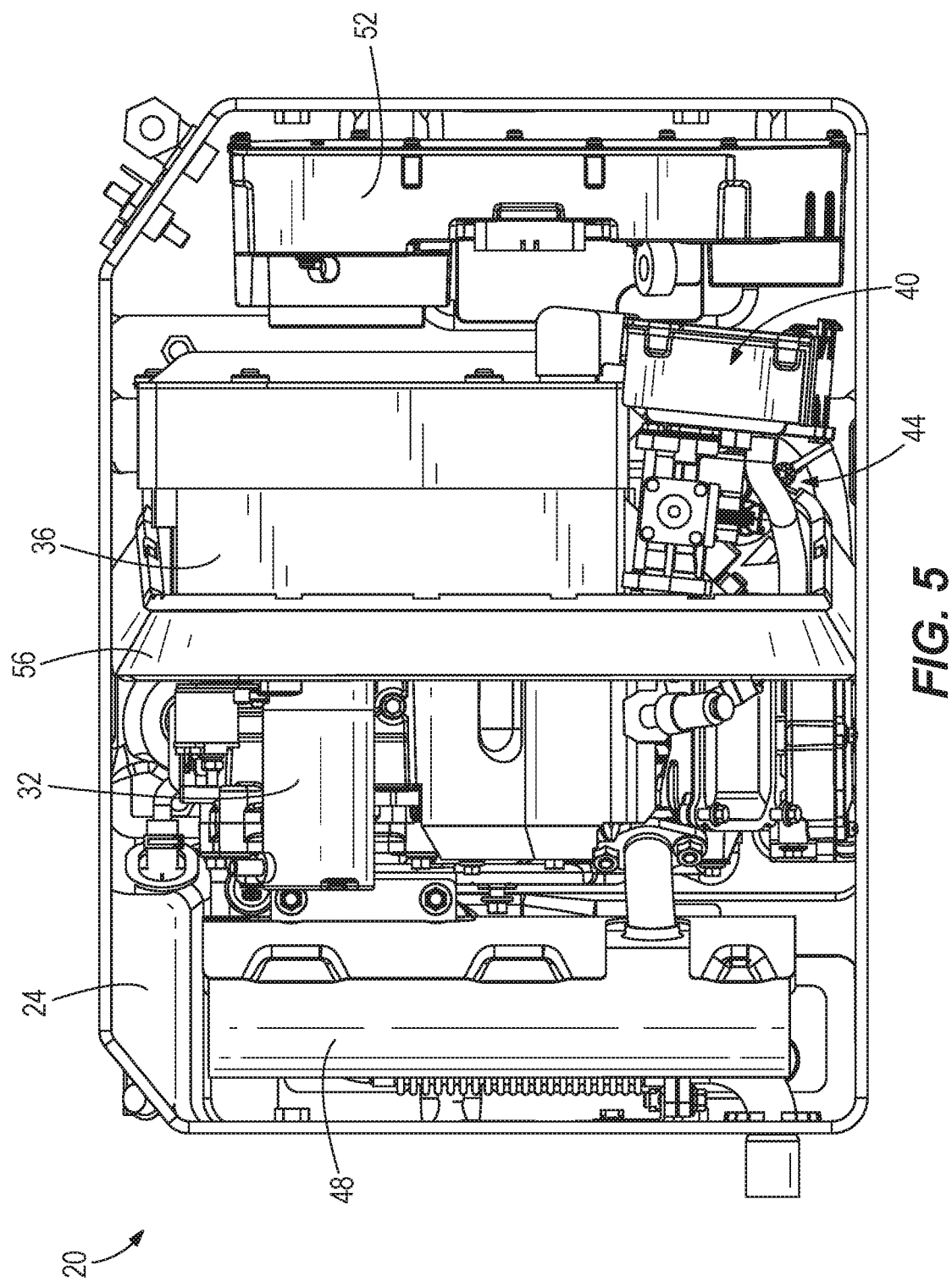
FIG. 5 is a top view of the generator set of FIG. 2.

As shown in FIGS. 3-5, the generator set 20 is compact and the air cleaner system 40 is sized to be received within an open space provided between the alternator 36 and the control unit 52. The air cleaner system 40 is structured to provide a full size air filter while allowing easy access by the end user and providing a minimized space claim within the internal volume of the genset housing 28. As shown in the exemplary embodiment of FIG. 3, the air cleaner system 40 can be spaced from the genset housing 28 by about six millimeters (6 mm), spaced from the alternator 36 by about three millimeters (3 mm), and spaced from lower components by about two millimeters (2 mm). In some embodiments, the air cleaner system 40 is tilted with respect to vertical by about 2.5 degrees. In some embodiments, the air cleaner system 40 can be tilted to be parallel with a profile of the alternator 36 or another large generator set component. As shown in the exemplary embodiment of FIG. 4, the air cleaner system 40 is spaced horizontally from the control unit 52 and the fuel management system 44. As shown in the exemplary embodiment of FIG. 5, the air cleaner system 40 can also be rotated with respect to horizontal by about five degrees. In some embodiments, the air cleaner system 40 is tilted and/or rotated to different degrees to follow the contours of the genset housing 28, the alternator 36, the control unit 52, and/or another component of the generator set 20.

Figure 6:
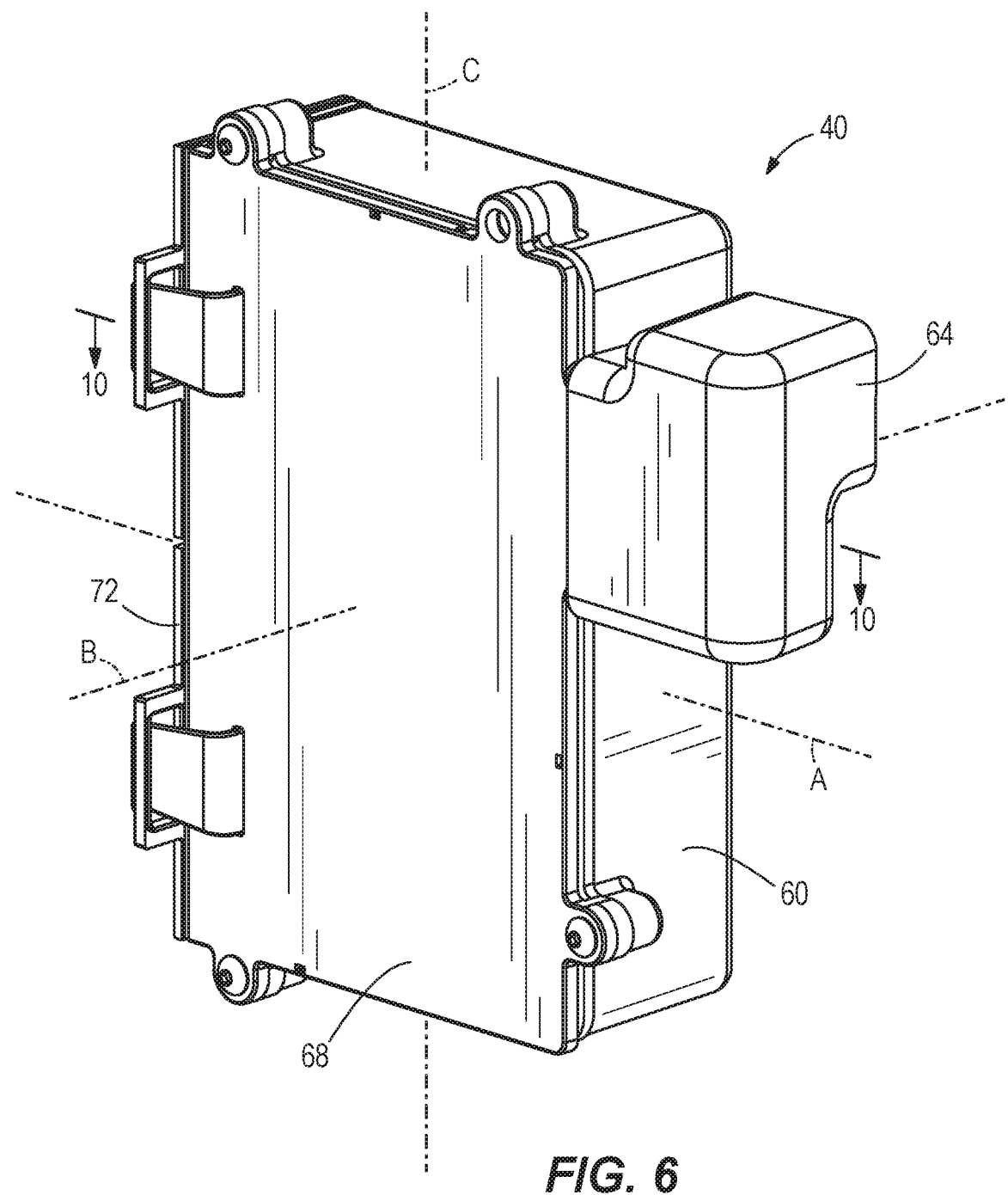
FIG. 6 is a perspective view of an air cleaner system of the generator set of FIG. 1.

As shown in FIG. 6, the air cleaner system 40 includes an air cleaner housing 60, a grommet 64 coupled to the air cleaner housing 60 and structured to connect to a resonator, and a housing cover or air cleaner cover 68 fastened to the air cleaner housing 60, and a removable air cleaner door 72. In some embodiments, the air cleaner housing 60 is formed of plastic and the grommet 64 is captured between the air cleaner housing 60 and the air cleaner cover 68. In some embodiments, the air cleaner cover 68 is adhered to or formed as a single piece with the air cleaner housing 60. In some embodiments, the grommet 64 is eliminated.

The air cleaner system 40 defines a first axis A, a second axis B perpendicular to the first axis A, and a third axis C perpendicular to the first axis A and the second axis B. The air cleaner door 72 is removable from the air cleaner housing 60 substantially linearly along the first axis A.

Figure 7:
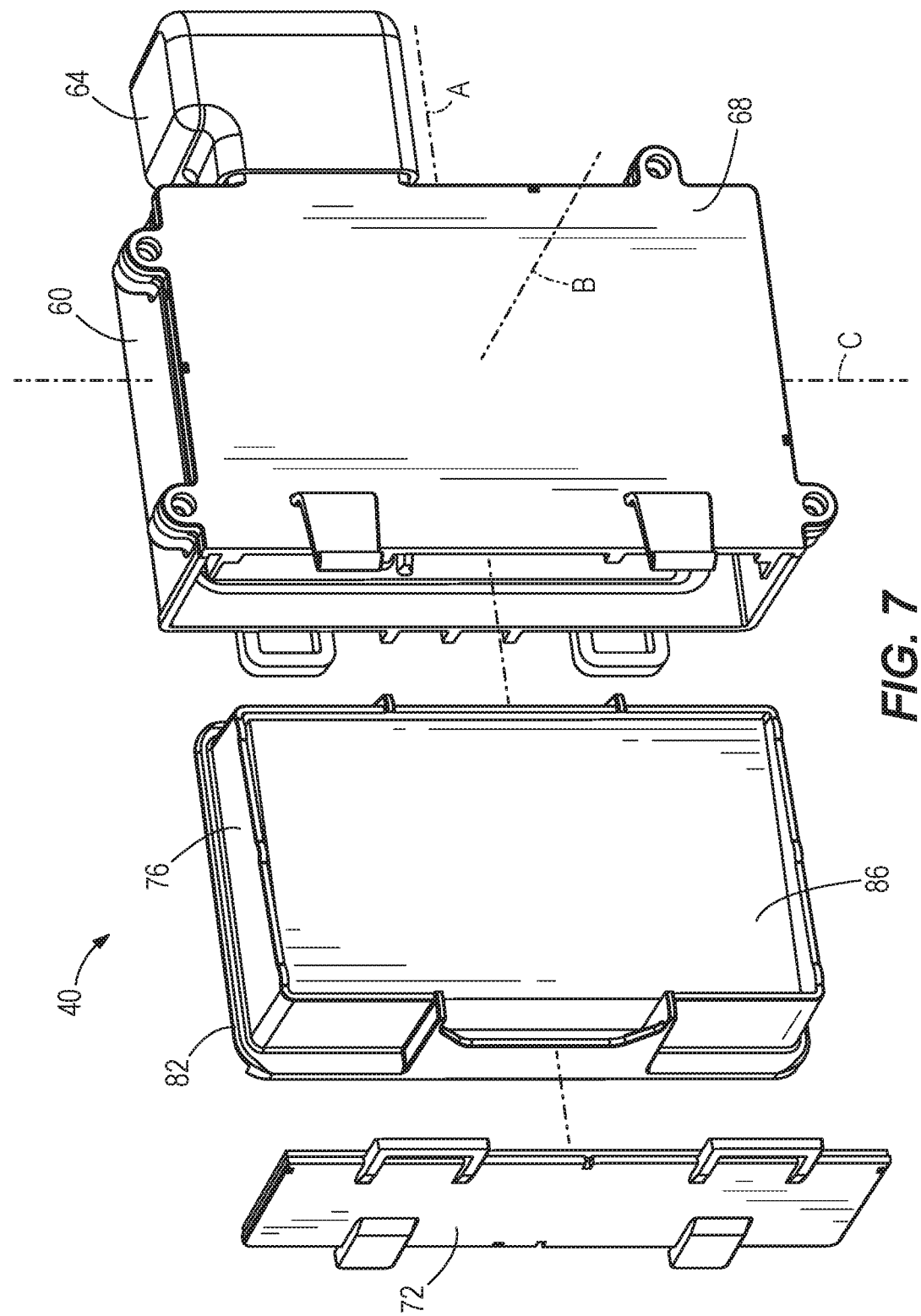
FIG. 7 is a perspective view of the air cleaner system of FIG. 6 in an open position.

As shown in FIG. 7, a carrier 76 is sized to be received within the air cleaner housing 60. The carrier 76 includes an air filter receiving feature in the form of a carrier flange 82 that is structured to hold an air filter element 86. In some embodiments, the carrier 76 is formed of plastic and is sized to slide into the air cleaner housing 60 linearly along the first axis A. The door 72 includes clips, fasteners, or hook closures that are structured to connect the door 72 to the air cleaner housing 60. In some embodiments, the door 72 covers a relatively narrow end or side of the air cleaner housing 60 and not the widest or largest face of the air cleaner housing 60. In some embodiments, the air cleaner cover 68 is larger than the door 72 in a width direction. For example, the air cleaner cover 68 can be over twice as wide as the door 72.

Figure 8:
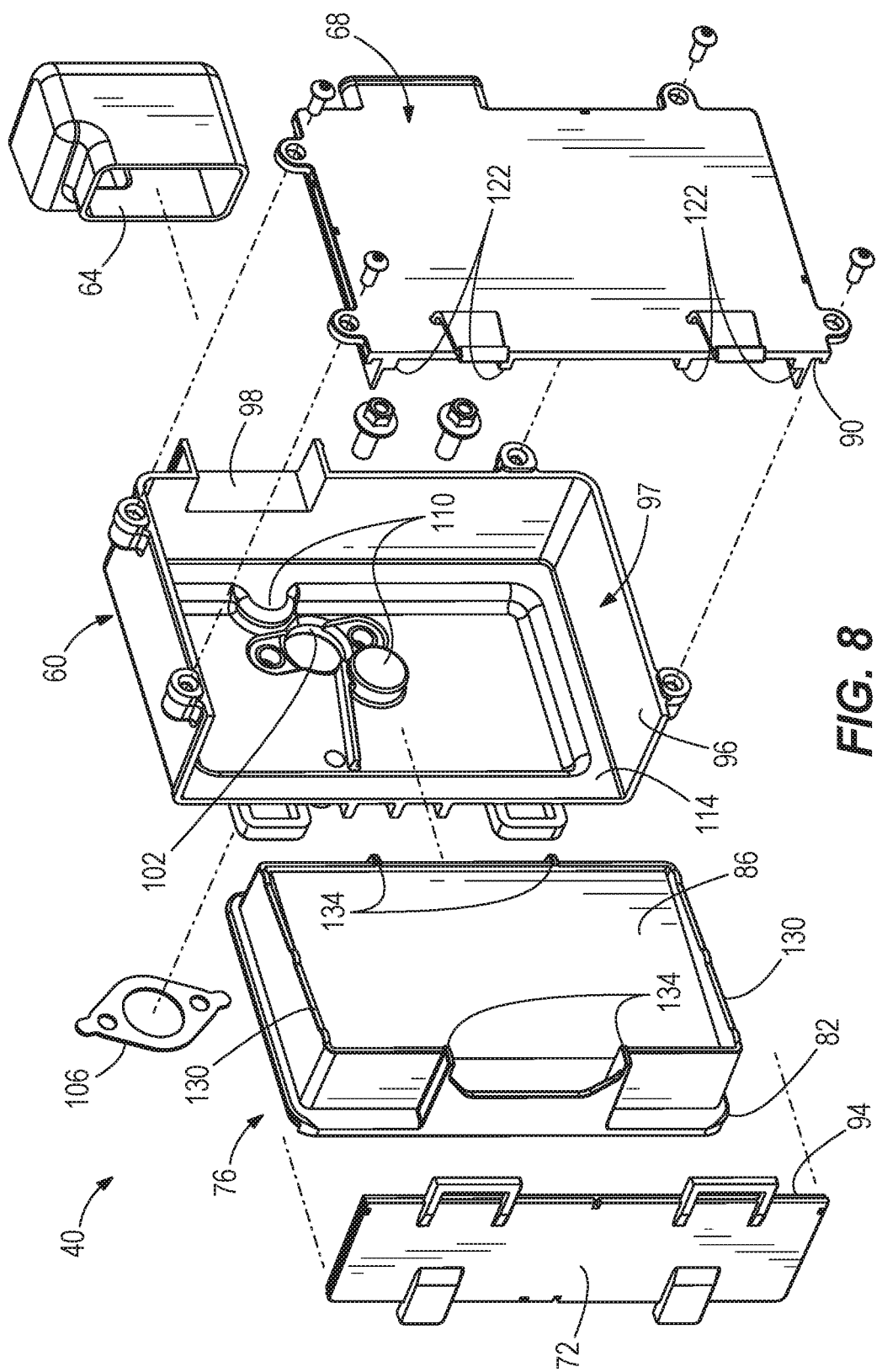
FIG. 8 is an exploded view of the air cleaner system of FIG. 6.

As shown in FIG. 8, a housing gasket 90 is positioned between the air cleaner housing 60 and the air cleaner cover 68 to provide a seal therebetween. A door gasket 94 is sized to be engaged with the air cleaner door 72 for selectively providing a seal between the air cleaner housing 60, the air cleaner cover 68, and the air cleaner door 72 when the air cleaner door 72 is installed. In some embodiments, the housing gasket 90 and the door gasket 94 can be replaced with overmolded gaskets (e.g. a rubber gasket material) sized to provide a seal under compression.

With continued reference to FIG. 8, the air cleaner housing 60 includes walls 96 defining and housing cavity 97, an inlet 98 sized to receive the grommet 64 and providing fresh air to the housing cavity 97, and an outlet 102 in communication with the housing cavity 97 and structured to provide cleaned air to the engine 32. An engine gasket 106 is provided between the outlet 102 and the engine 32. In some embodiments, the air cleaner housing 60 includes metal inserts that are positioned to receive fasteners for assembling the air cleaner system 40. The air cleaner housing 60 further includes projections 110 positioned adjacent the outlet 102 and structured to hide or hold nuts or fasteners for holding a throttle body to the engine 32. The projections 110 allow the air cleaner system 40 to be moved laterally toward the genset inlet by adding two new through holes in the air cleaner system 40 to connect to the throttle body. A selectively sealable filter opening in the form of a filter sealing seat 114 extends around a periphery of the outlet 102 and is offset from the outlet 102 so that the filter sealing seat 114 is positioned between the inlet 98 and the outlet 102. In some embodiments, the filter sealing seat 114 can be considered a planar outlet seal seat. In some embodiments, the filter sealing seat 114 is defined in a plane that is parallel to a plane intersecting the first axis A and the third axis C and offset from the outlet 102 along the second axis B.

As shown in FIG. 9, the air filter element 86 includes a filter gasket 118 that extends around a periphery of the air filter element 86 and is sized to sealingly engage the filter sealing seat 114 of the air cleaner housing 60. Additionally, the filter gasket 118 is sized to be engaged by the carrier flange 82. In some embodiments, the filter gasket 118 is press fit into the carrier flange 82 to maintain the air filter element 86 within the carrier 76. In some embodiments, the filter gasket 118 is formed of a resilient rubber material or a foam material.

As shown in FIG. 10, the air cleaner cover 68 and the carrier 76 combine to provide a cam system that moves the filter gasket 118 in a second direction parallel to the second axis B and into sealed engagement with the filter sealing seat 114 while the carrier is moved in a first direction parallel to the first axis A. In other words, as the carrier 76 is inserted into the air cleaner housing 60, the cam system causes the filter gasket 118 to sealingly contact the filter sealing seat 114.

The air cleaner cover 68 includes a housing cam in the form of four ribs or housing ramps 122 extending into the housing cavity 97 and arranged at an oblique housing ramp angle 126 relative to the first axis A. In some embodiments, the housing ramp angle 126 is five degrees. In some embodiments, the housing ramp angle 126 is between two degrees and ten degrees. The housing ramps 122 are spaced apart from one another and allow airflow therebetween. In some embodiments, the housing ramps 122 are equally spaced apart. In some embodiments, more than four or less than four housing ramps 122 are provided. In some embodiments, the spacing between the housing ramps 122 is unequal. The housing ramps 122 provide a linear slope at the housing ramp angle 126. In some embodiments, the housing cam may provide a stepped profile, an arcuate profile, or another cam profile structured to engage the carrier and move the filter gasket 118 toward the filter sealing seat 114. In some embodiments, the housing cam is formed as a part of the air cleaner housing 60 and is not a part of the air cleaner cover 68.

The carrier 76 includes a carrier cam in the form of two carrier ramps 130 and four carrier projections 134. The carrier 76 includes cam follower features in the form of ramp projections 138 that together with the carrier projections 134 are arranged to slidingly contact the housing ramps 122. The ramp projections 138 and the carrier projections 134 are structured to reduce sliding friction and wear on the carrier 76 during use. In some embodiments, the carrier projections 134 and the ramp projections 138 are eliminated. In some embodiments, more or less ramp projections 138 are provided. The carrier ramps 130 are arranged at an oblique carrier ramp angle 142 relative to the first axis A. In some embodiments, the carrier ramp angle 142 is five degrees. In some embodiments, the carrier ramp angle 142 is between two degrees and ten degrees. In some embodiments, the carrier ramp angle 142 is a mirror of the housing ramp angle 126. In some embodiments, the carrier ramp angle 142 is different than the housing ramp angle 126. In some embodiments, the carrier cam is structured as a cam follower that interacts with the housing cam.

Figure 11:
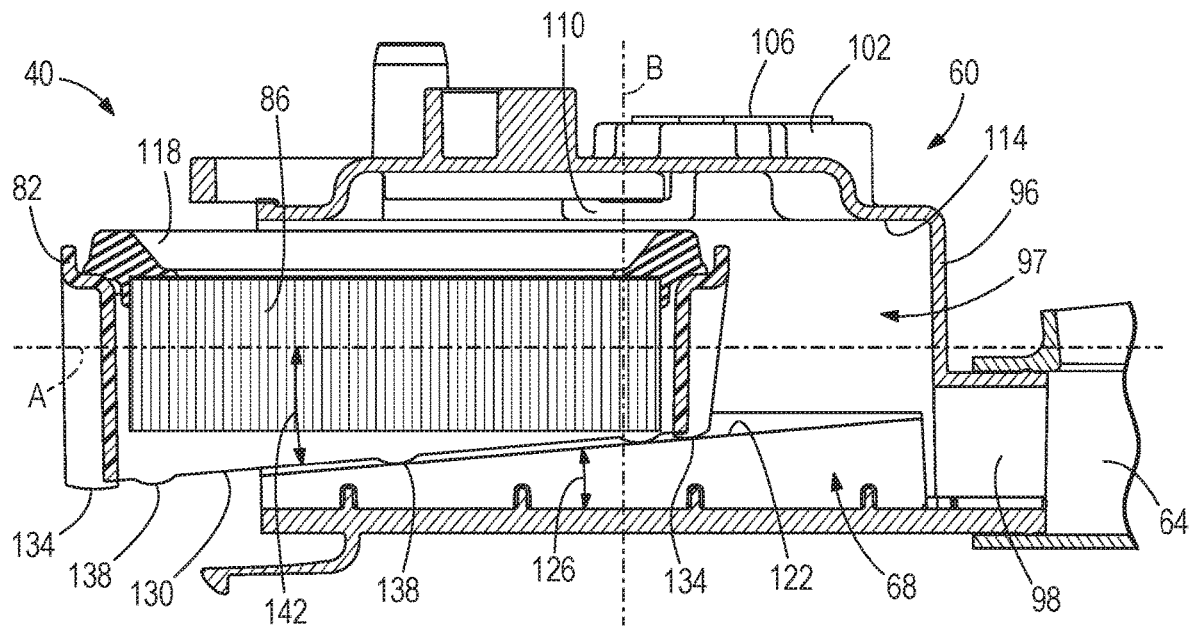
FIG. 11 is a section view of the air cleaner system in a second position taken along line 10-10 of FIG. 6.
Figure 12:
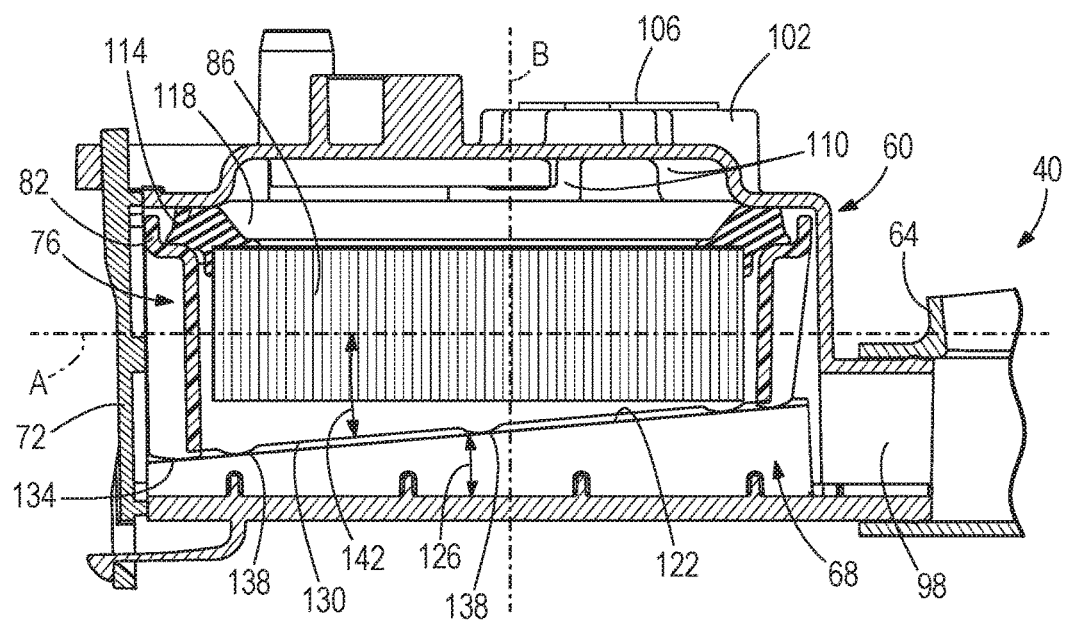
FIG. 12 is a section view of the air cleaner system in a third position taken along line 10-10 of FIG. 6.

In operation and with reference to FIGS. 10, 11, and 12, the air cleaner door 72 is removed from the air cleaner housing 60 by removing the fasteners and pulling the air cleaner door linearly away from the air cleaner housing 60 along the first axis A. The air filter element 86 is installed with the filter gasket 118 seated in the carrier flange 82. With the air cleaner door 72 removed, the assembled carrier 76 and air filter element 86 are slid into the air cleaner housing 60 along the first axis A until the carrier ramps 130 engage the housing ramps 122.

As shown in FIG. 11, as the carrier 76 is slid into the air cleaner housing 60 in a first direction along the first axis A, the interaction of the housing ramps 122 and the carrier ramps 130 moves the filter gasket 118 toward the filter sealing seat 114 in a second direction along the second axis B. The ramp projections 138 and the carrier projections 134 slide on the housing ramps 122, providing a smooth insertion and extraction of the carrier 76 from the air cleaner housing 60. In some embodiments, the second axis B is perpendicular to the first axis A, so that movement in the first direction along the first axis A results in the movement of the filter gasket 118 in a direction perpendicular to the direction the user is pushing the carrier 76 (i.e., the second direction is perpendicular to the first direction). In some embodiments, the second direction and second axis B are structured at an oblique angle relative to the first direction and the first axis A so that movement in the first direction results in movement of the filter gasket 118 in a second direction that is not perpendicular to the first axis A. The movement of the filter gasket 118 is transverse to the first direction and the first axis A.

As shown in FIG. 12, when the carrier 76 is fully inserted into the air cleaner housing 60, the interaction of the housing ramps 122 and the carrier ramps 130 moves the filter gasket 118 into complete sealing engagement with the filter sealing seat 114. With the carrier 76 fully inserted, the air cleaner door 72 is reinstalled and fastened to the air cleaner housing 60 thereby sealing the housing cavity 97. The filter gasket 118 is sealed relative to the filter sealing seat 114 so that the inlet 98 is isolated from the outlet 102 with the air filter element 86 arranged therebetween. During use, air flows from the inlet 98, through the air filter element 86, and out the outlet 102 for use downstream by the engine 32.

Figure 13:
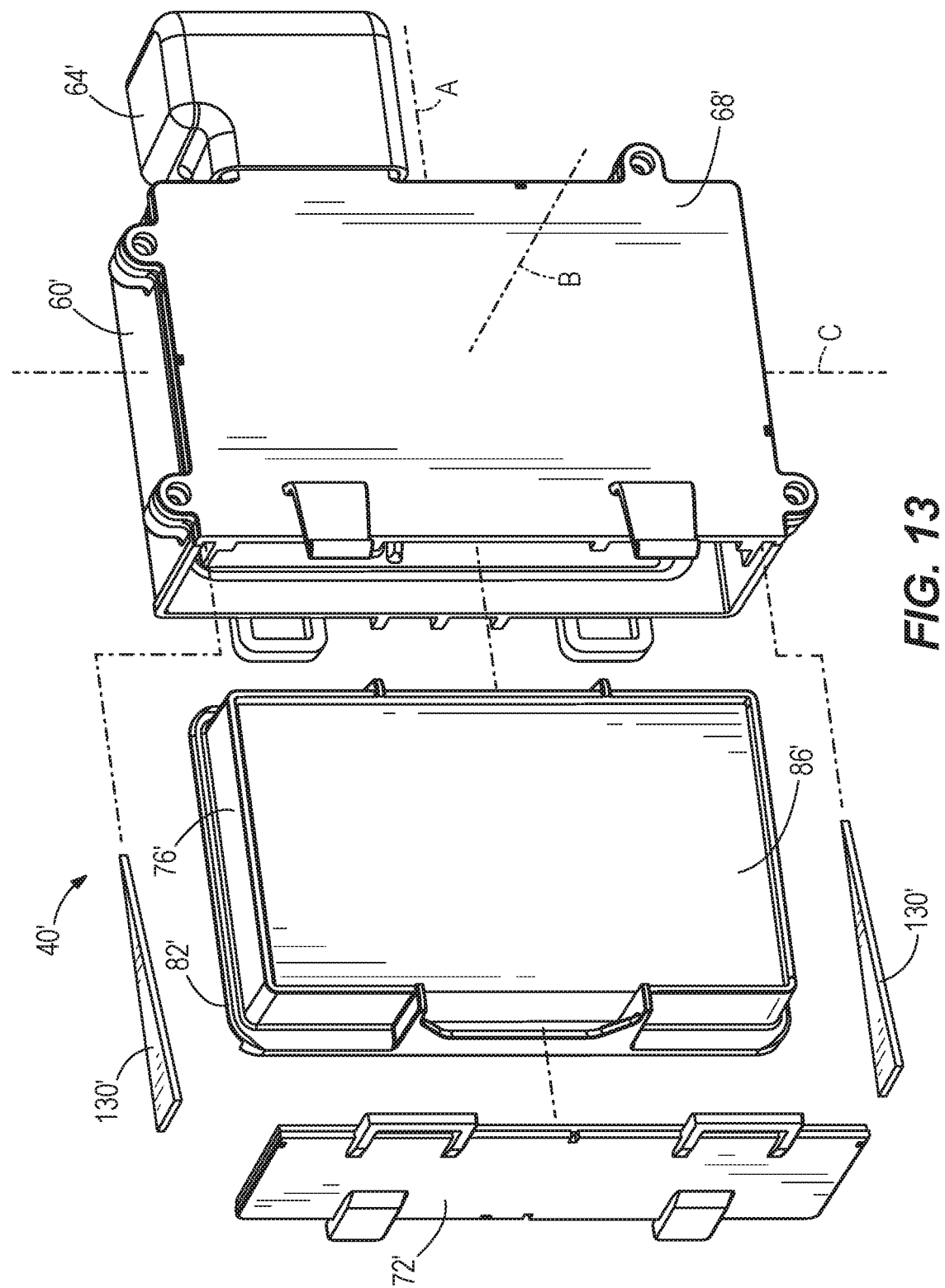
FIG. 13 is a perspective view of another air cleaner system in an open position according to some embodiments.
Figure 14:
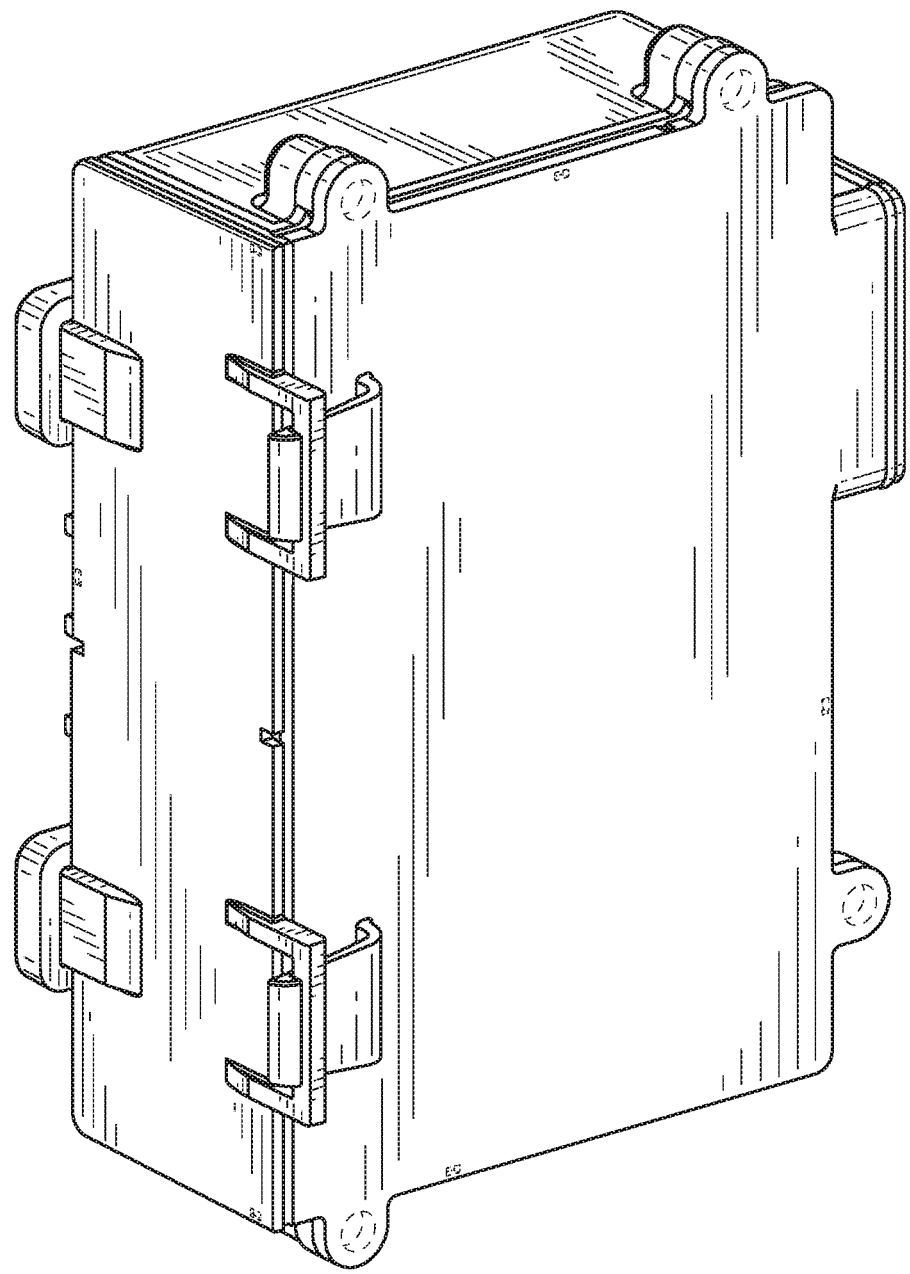
FIG. 14 is a perspective view of an air cleaner system in a first arrangement according to some embodiments.
Figure 15:
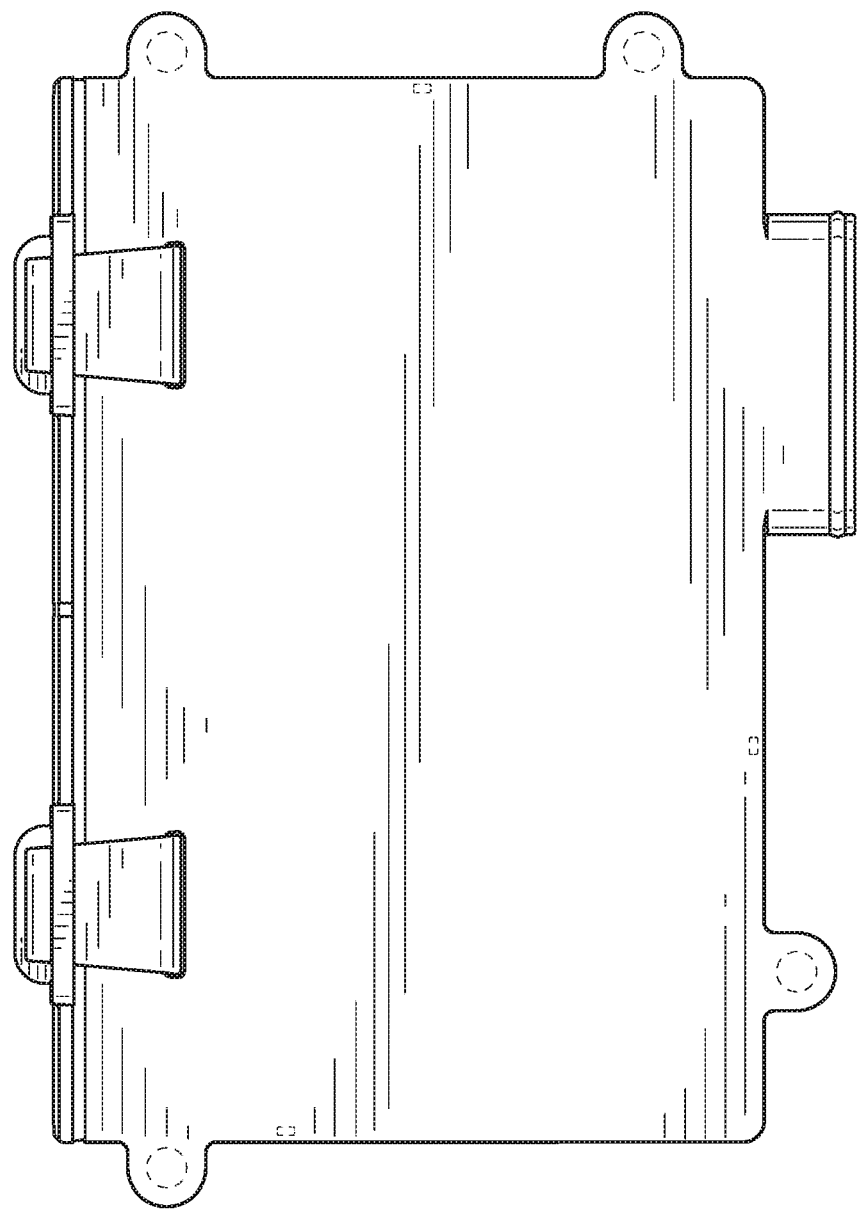
FIG. 15 is a right side view of the air cleaner system of FIG. 14 in the first arrangement.
Figure 16:
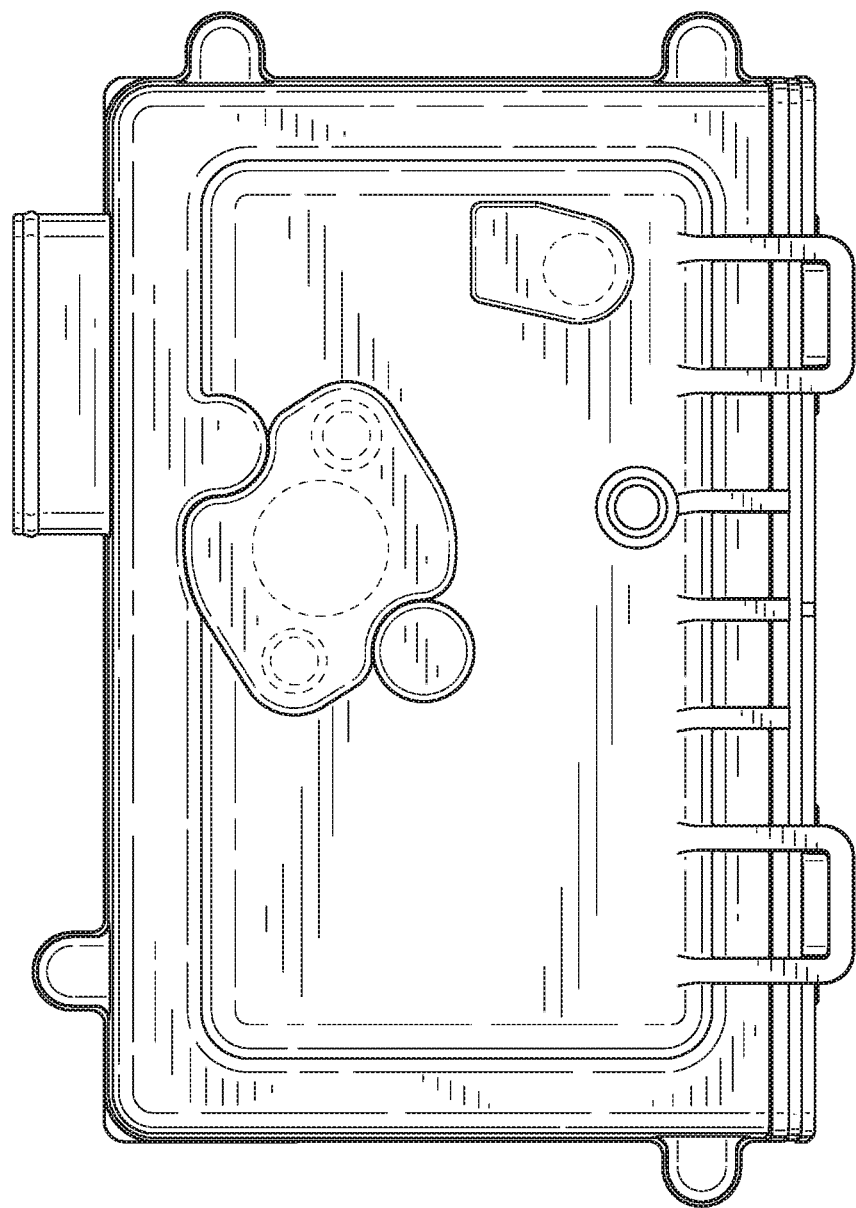
FIG. 16 is a left side view of the air cleaner system of FIG. 14 in the first arrangement.
Figure 17:
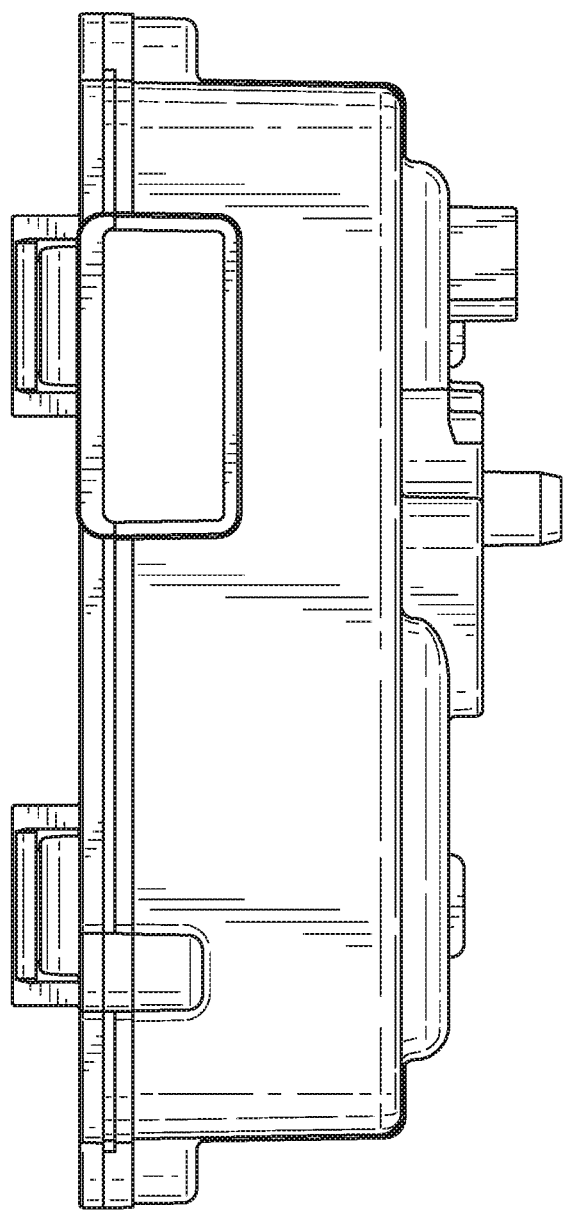
FIG. 17 is a back view of the air cleaner system of FIG. 14 in the first arrangement.
Figure 18:
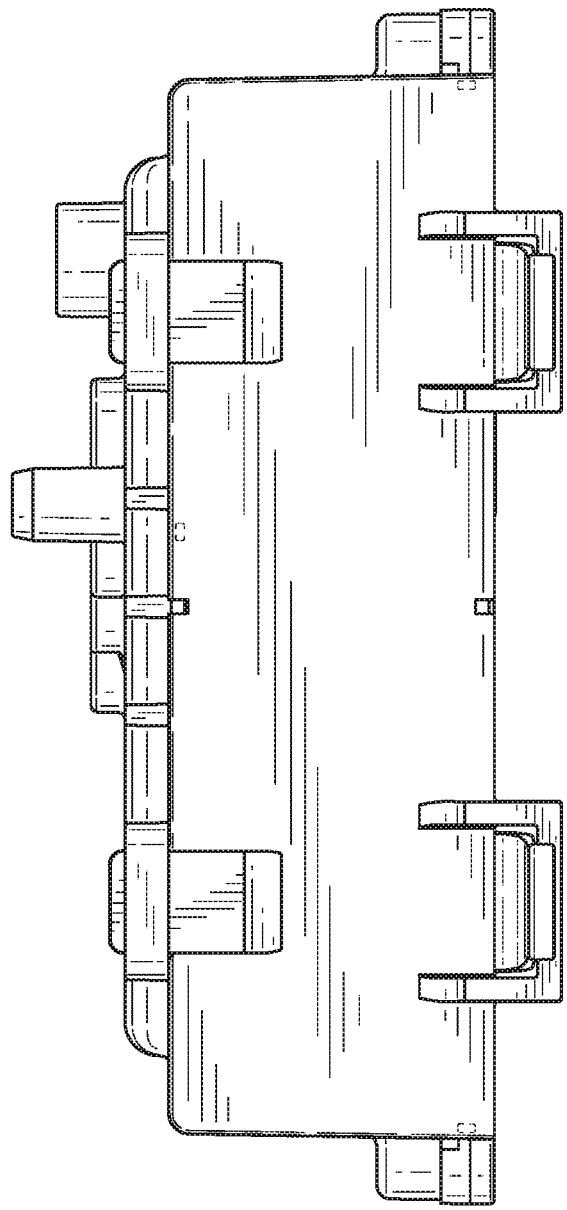
FIG. 18 is a front view of the air cleaner system of FIG. 14 in the first arrangement.
Figure 19:
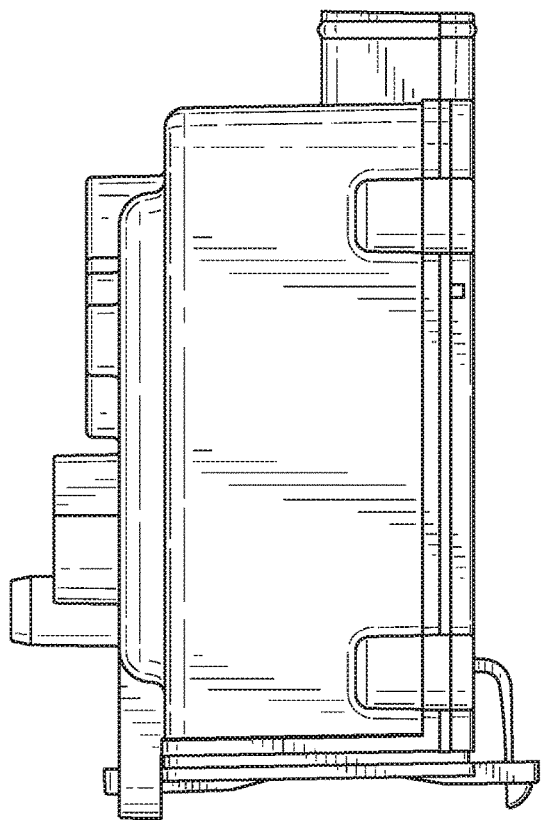
FIG. 19 is a top view of the air cleaner system of FIG. 14 in the first arrangement.
Figure 20:
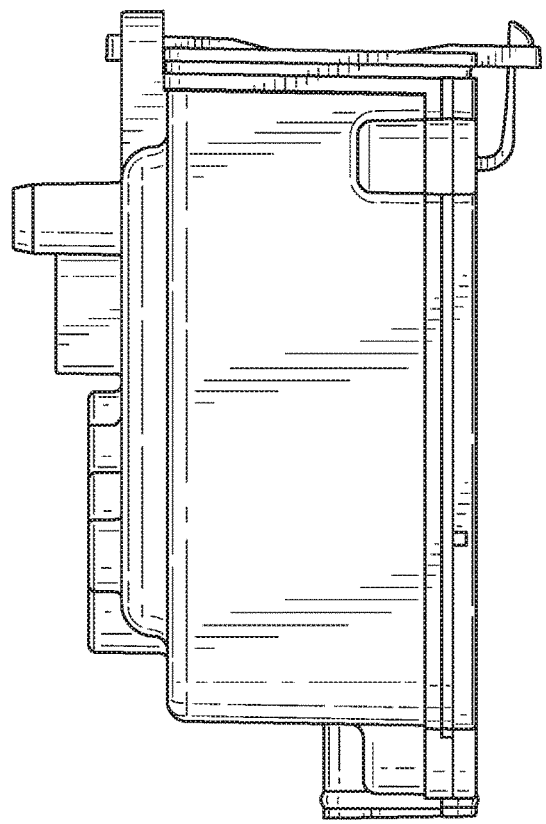
FIG. 20 is a bottom view of the air cleaner system of FIG. 14 in the first arrangement.
Figure 21:
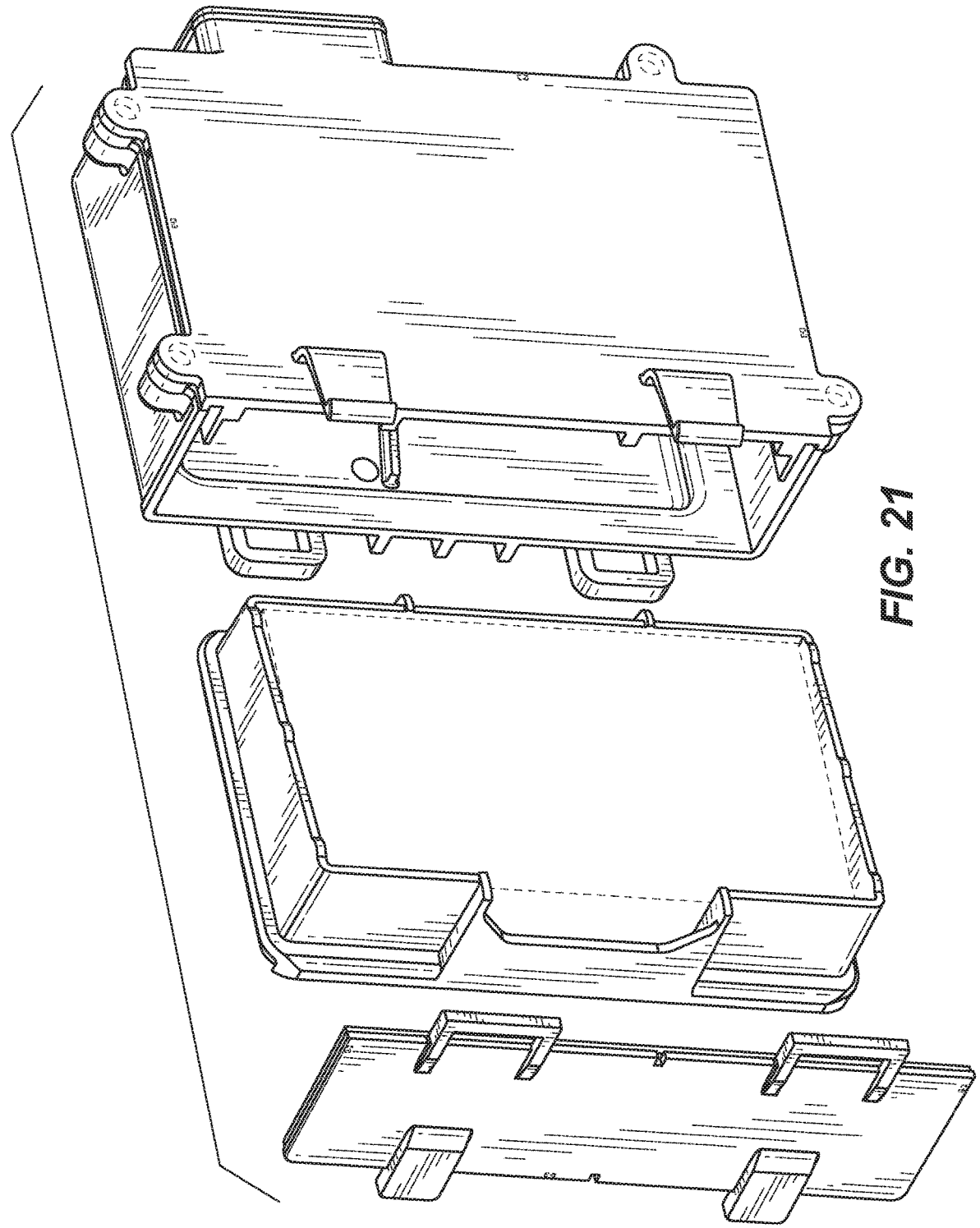
FIG. 21 is a perspective view of the air cleaner system of FIG. 14 in a second arrangement according to some embodiments.
Figure 22:
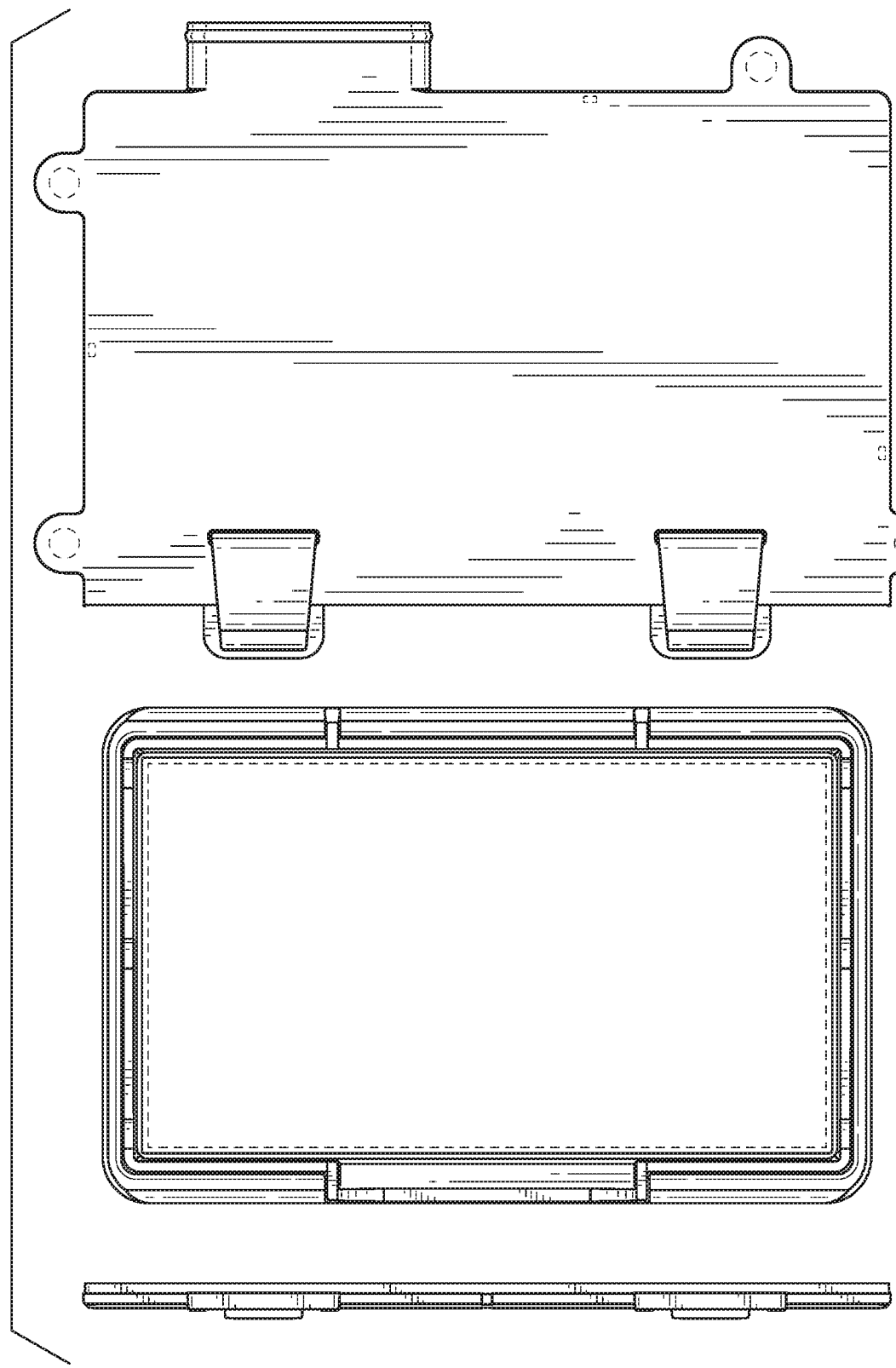
FIG. 22 is a right side view of the air cleaner system of FIG. 14 in the second arrangement.
Figure 23:
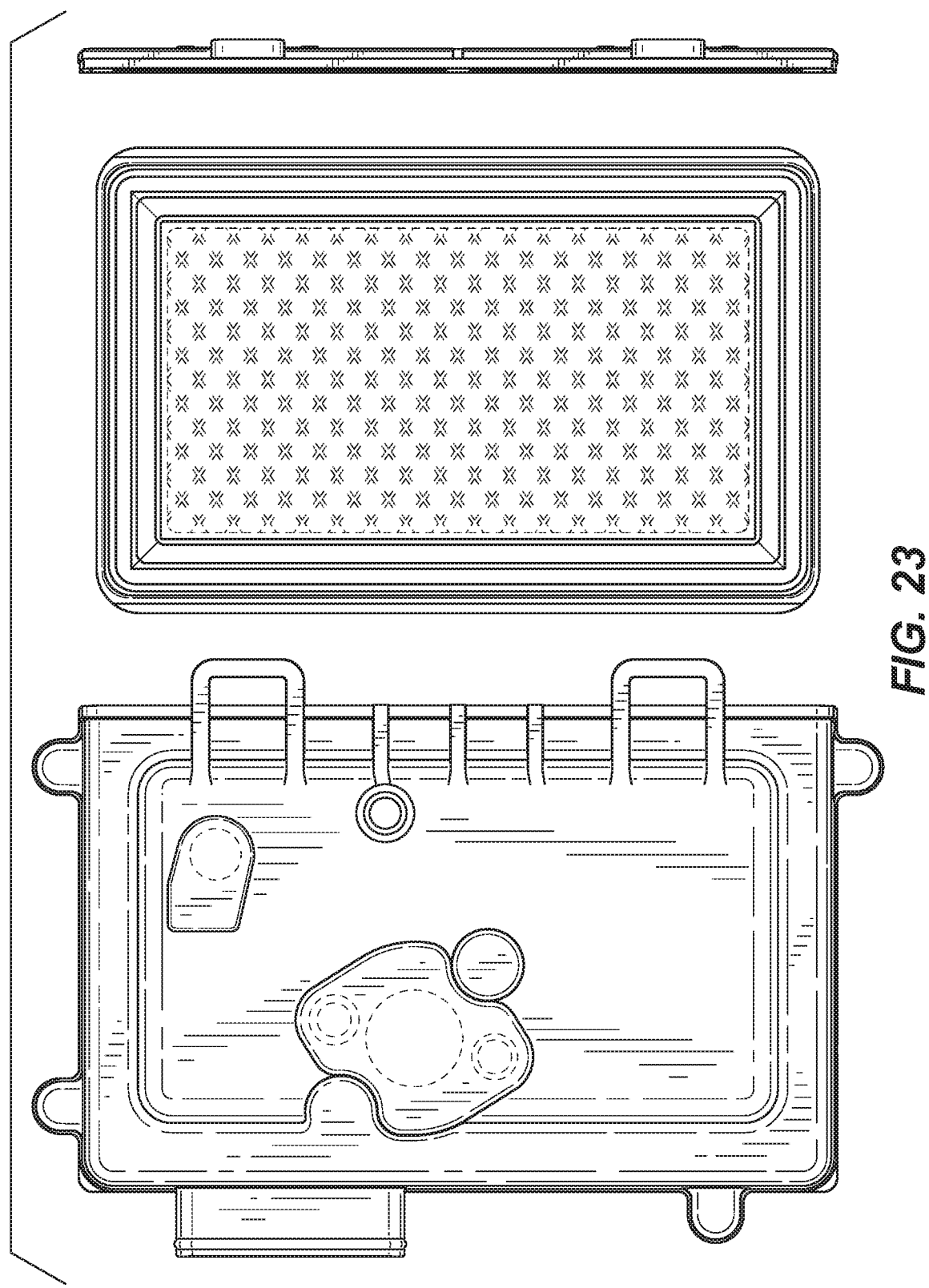
FIG. 23 is a left side view of the air cleaner system of FIG. 14 in the second arrangement.
Figure 24:
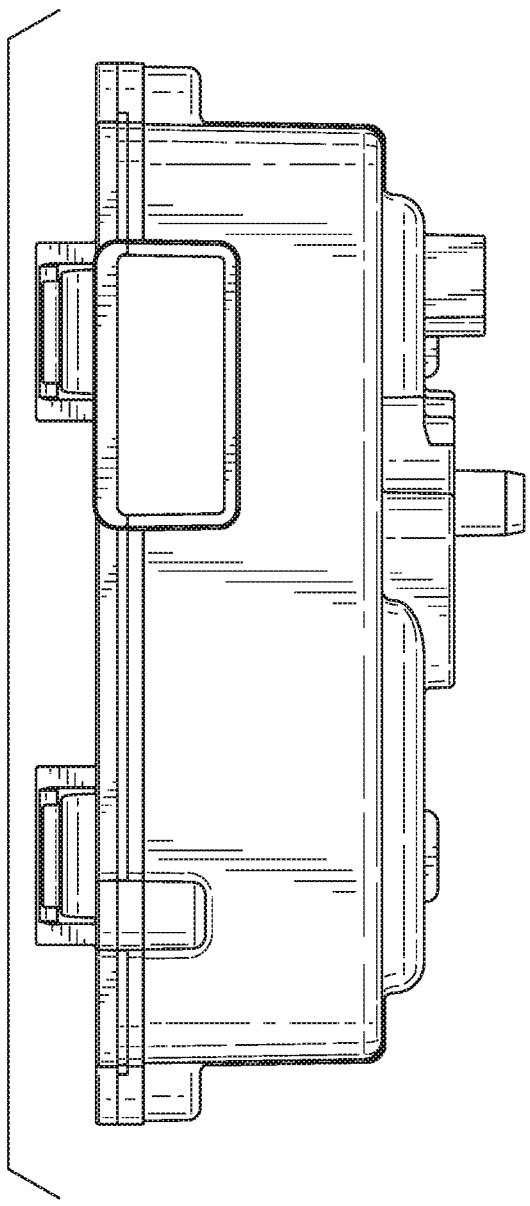
FIG. 24 is a back view of the air cleaner system of FIG. 14 in the second arrangement.
Figure 25:
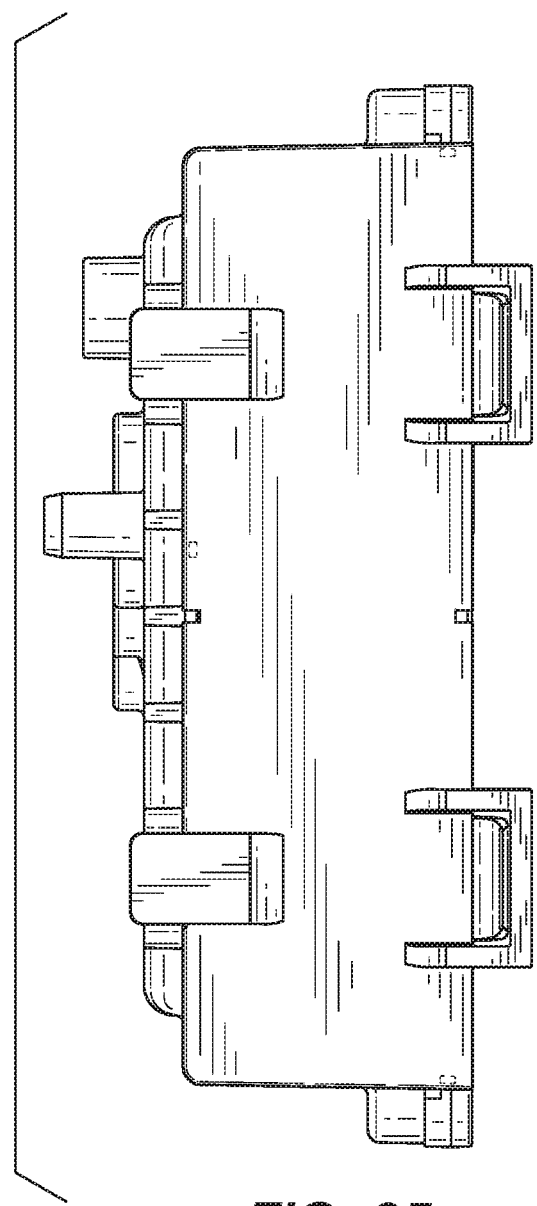
FIG. 25 is a front view of the air cleaner system of FIG. 14 in the second arrangement.
Figure 26:
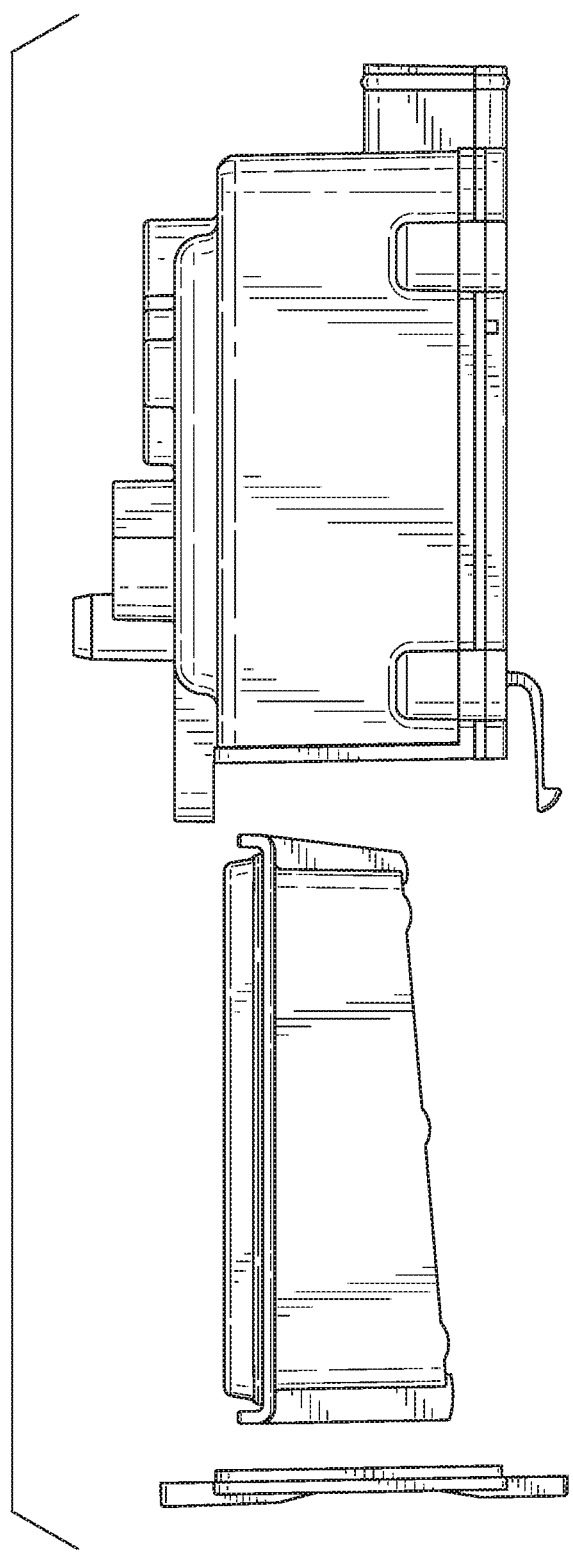
FIG. 26 is a top view of the air cleaner system of FIG. 14 in the second arrangement.
Figure 27:
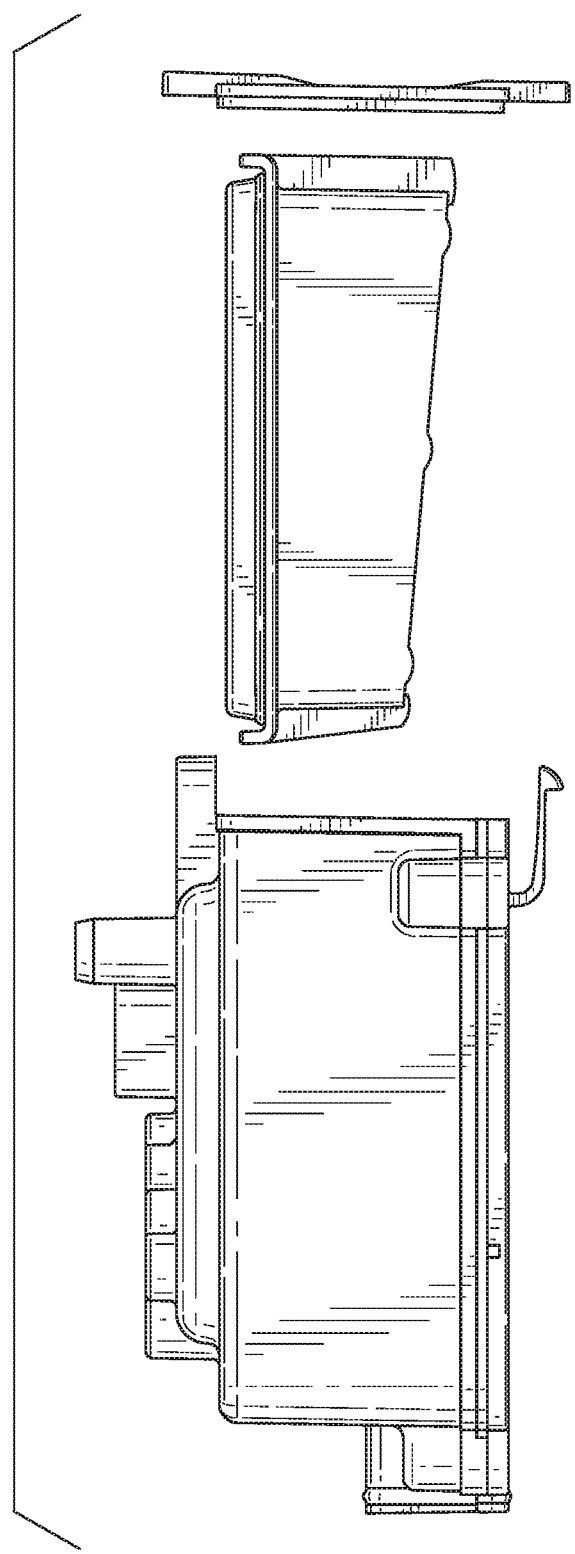
FIG. 27 is a bottom view of the air cleaner system of FIG. 14 in the second arrangement.

In some embodiments, for example as shown in FIG. 13, an air cleaner system 40' with similar parts to the air cleaner system 40 discussed above includes a carrier ramp 130' or carrier cam that can be formed on the door 72' or otherwise not formed on the carrier 76'. The carrier 76' can be substantially rectangular shaped and easily inserted into the air cleaner housing 60' without self compressing the filter gasket 118' against the filter sealing seat 114'. The door 72' can include ramps or carrier cams that project therefrom so that installation of the door 72' onto the air cleaner housing 60' results in the ramps coupled to the door 72' engaging the carrier 76' and the housing ramps 122' and wedging or moving the filter gasket 118' into sealing engagement with the filter sealing seal 114'. In some embodiments, the ramps attached to the door 72' can be considered wedge blocks shaped to interact with both the carrier 76' and the air cleaner housing 60' to effectively seal the filter 86' within the air cleaner housing 60'. As shown in FIG. 13, the wedge ramps or blocks 130' can be separate from both the carrier 76' and the door 72' so that independently movable wedge blocks are inserted between the carrier 76' and the air cleaner housing 60' to seal the filter 86' to the housing 60'.

In general, the arrangement of the air cleaner housing 60, the door 72, and the carrier 76 allow the user to insert the carrier 76 and filter 86 into the air cleaner housing 60, and the ramp/cam system is structured to translate linear motion of a carrier ramp (e.g., attached to the carrier 76, the door 72, or independently movable) in a first direction into movement of the carrier 76 and the filter 86 in a second direction different than the first direction to provide a seal between the filter 86 and the air cleaner housing 60.

FIGS. 14-27 illustrate an exemplary aesthetic design for an air cleaner system.

Figure 28:
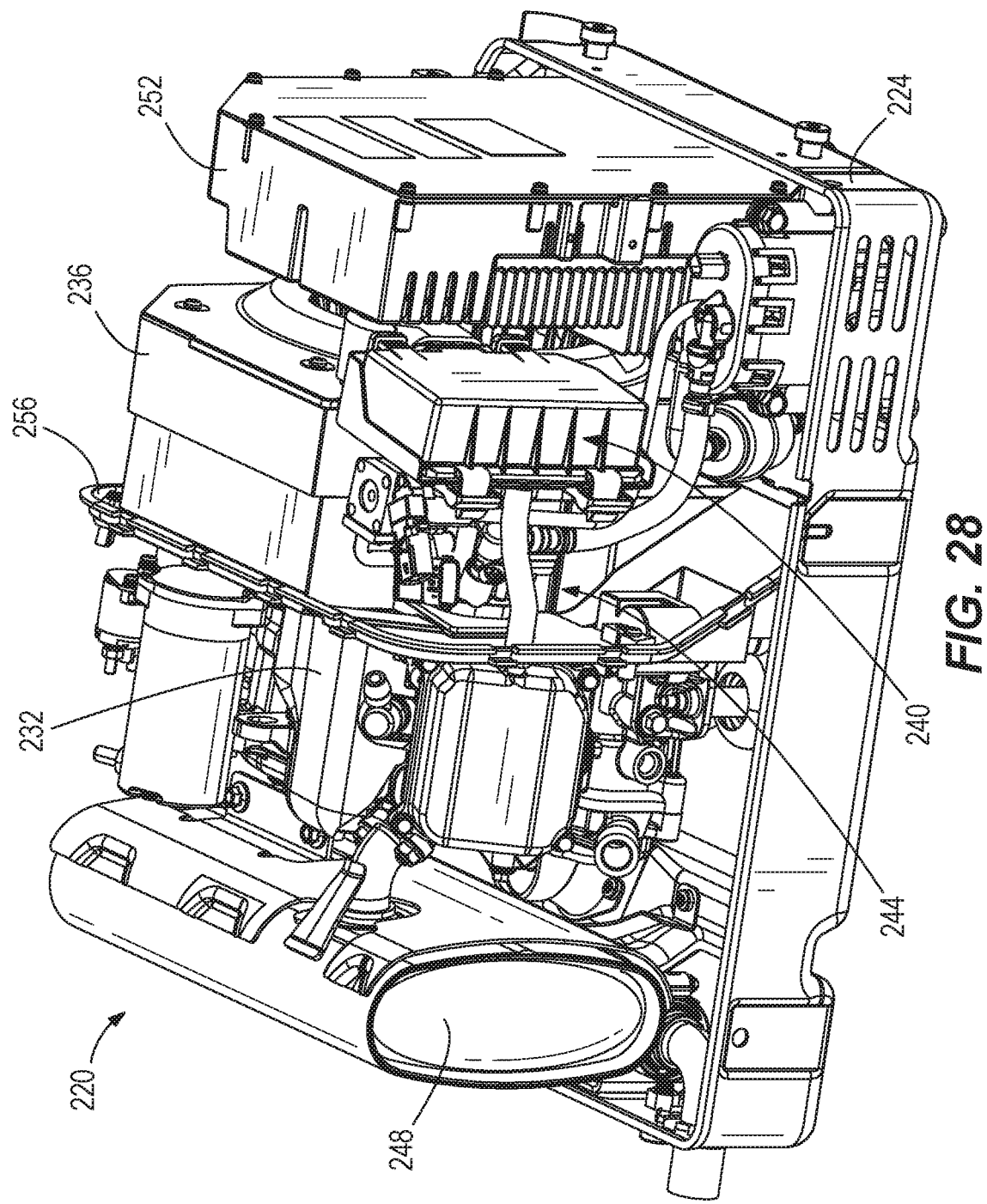
FIG. 28 is a perspective view of another generator set with a housing removed according to some embodiments.

Another a generator set 220 is shown in FIG. 28 and includes a chassis 224 and a genset housing (not shown) that is fastened to the chassis 224. In some embodiments, the generator set 220 outputs under three kilowatts (3 kW) of power. In some embodiments, the generator set 220 is arranged to provide power to a class B type motorhome. It is desirable for these types of generator sets to be compact with a small footprint. The genset housing can include intake, exhaust, and user interface features similar to those discussed above with respect to generator set 20 shown in FIG. 1. For example, openings or access panels may be provided that allow a user to connect powered electronics, add fuel, or service components of the generator set 220. In some embodiments, the genset housing is constructed of a molded plastic and includes heat resistant panels in strategic locations for heat management.

An engine 232 is mounted to the chassis 224, and an alternator 236 is coupled to the engine 232. The engine 232 includes an air cleaner system 240, a fuel management system 244 (e.g., a fuel tank, a carburetor, an electronic fuel injection system, a fuel pump, etc.), and an after treatment system 248 (e.g., a muffler). In some embodiments, the engine 232 is a gasoline engine with a carburetor that is fluidly coupled to a vehicle fuel tank located remotely from the generator set 220. In some embodiments, the engine 232 provides a variable speed output (e.g., between 2400 and 2900 rpm). In some embodiments, the engine 232 defines a displacement of about 252 cubic centimeters.

The alternator 236 is coupled to the engine 232 to convert a mechanical output from the engine 232 into electrical output usable by electrical systems coupled to the generator set 220 (e.g., via a user interface provided on the genset chassis 224). In some embodiments, the alternator 236 is a permanent magnet type alternator. In some embodiments, the alternator 236 includes an inverter for providing alternating current power, direct current power, or a combination of both.

The generator set 220 also includes a control unit 252 structured to control operation of the alternator 236 and the engine 232. The control unit 252 can include an engine control unit structured to control aspects of combustion within the engine 232 (e.g., spark timing, fuel mixture, etc.) and aftertreatment (e.g., control exhaust gas recirculation, control a selective catalytic reduction system, monitor particulate filters, etc.). The control unit 252 can also control output parameters of the alternator 236 or control a battery system structured to provide the end user with desirable electrical output. In some embodiments, a heat shield 256 is positioned between a hot side of the generator set 220 and a cool side of the generator set 220 to reduce the impact of heat generated by the engine 232 on the electrical components.

Figure 29:
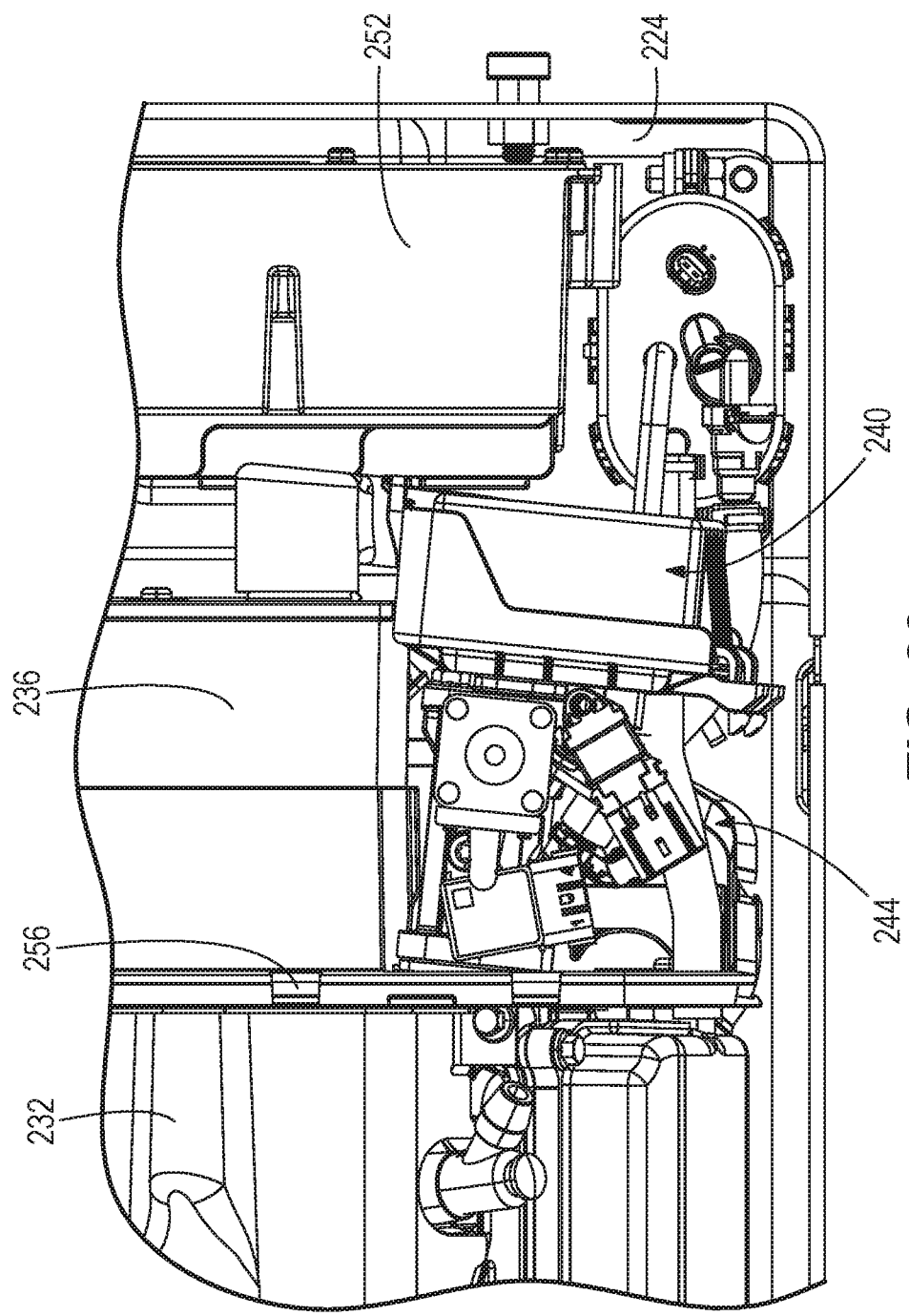
FIG. 29 is a top view of a right front portion of the generator set of FIG. 28.
Figure 30:
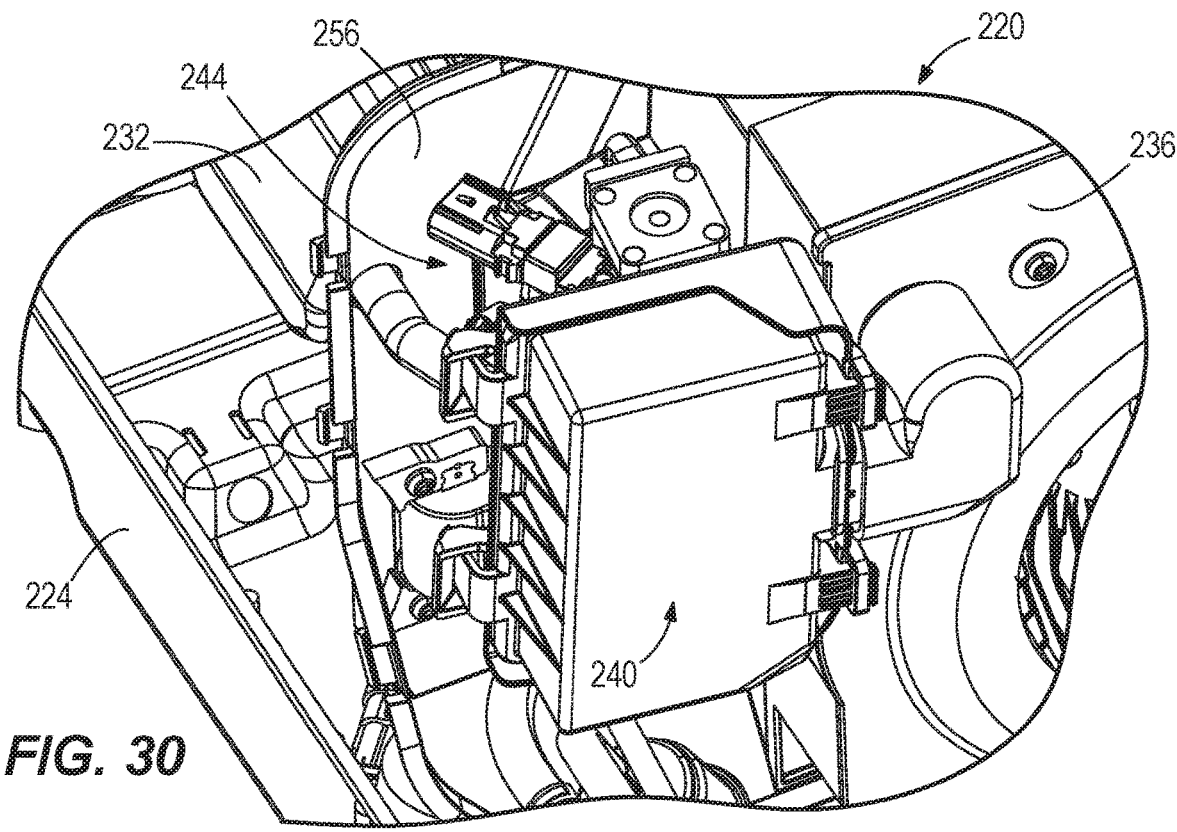
FIG. 30 is a perspective view of an air cleaner system of the generator set of FIG. 28.
Figure 31:
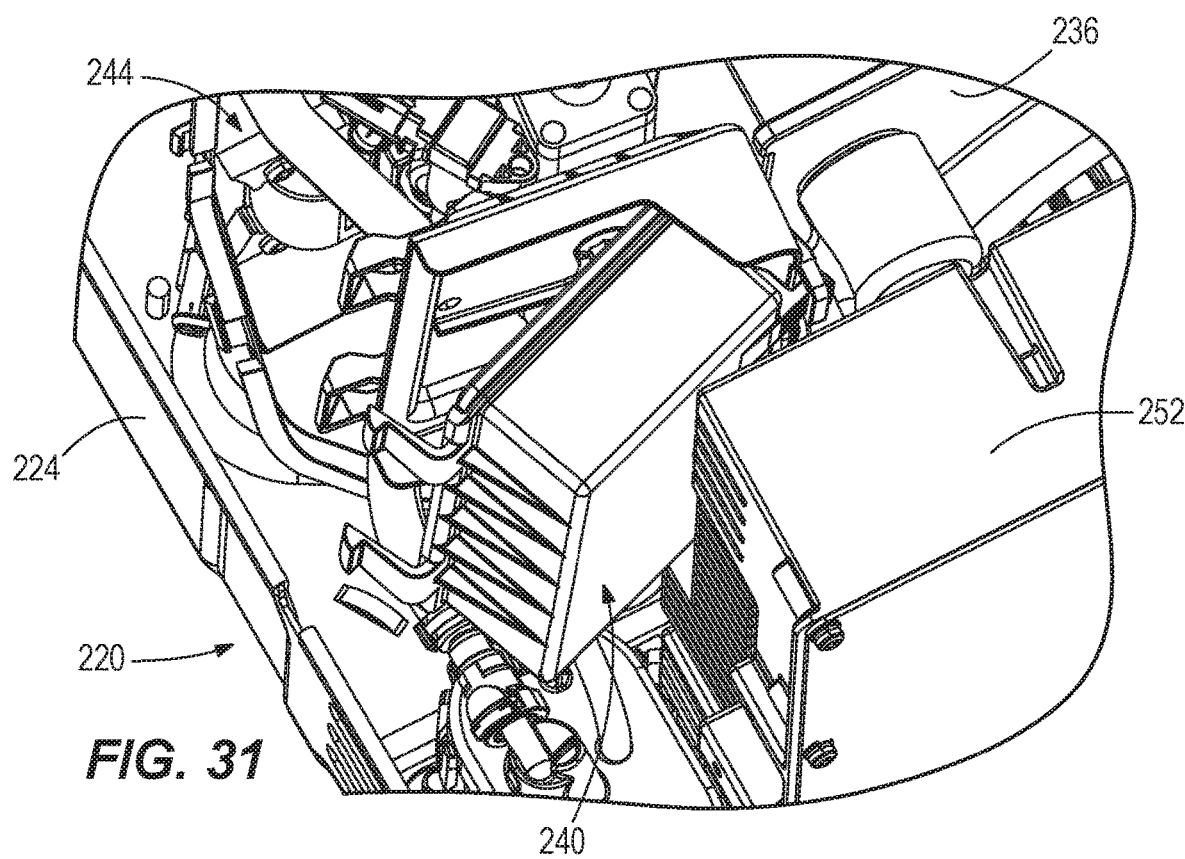
FIG. 31 is a perspective view of the air cleaner system of FIG. 30 in an open position.

As shown in FIGS. 29-31, the generator set 220 is compact and the air cleaner system 240 is sized to be received within an open space provided between the alternator 236 and the control unit 252. The air cleaner system 240 is structured to provide a full size air filter while allowing easy access by the end user and providing a minimized space claim within the internal volume of the genset housing. FIG. 30 shows the air cleaner system 240 in a closed position as it would be arranged during engine operation. FIG. 31 shows the air cleaner system 240 in an open position providing access for changing or otherwise servicing a filter element.

Figure 32:
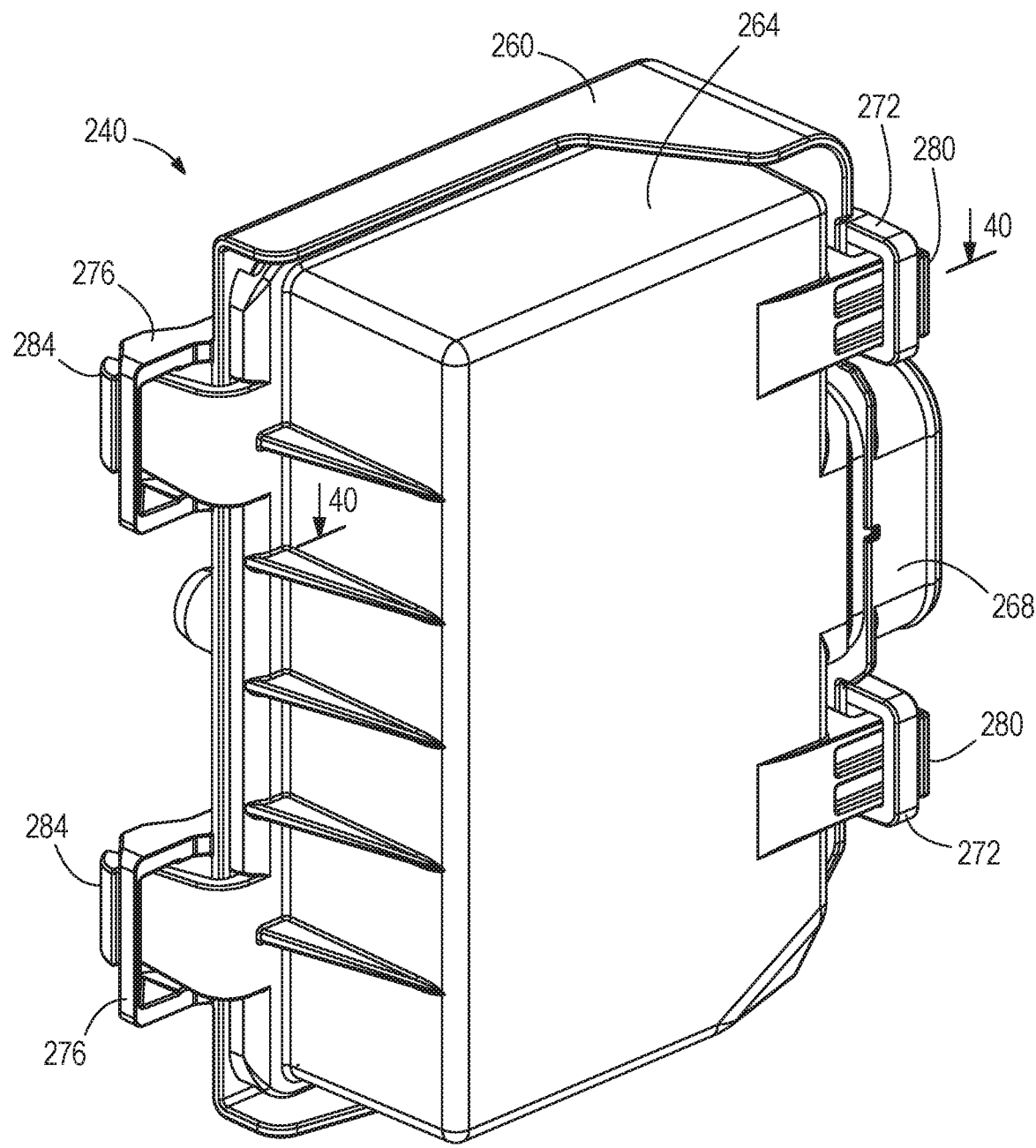
FIG. 32 is a perspective view of the air cleaner system of FIG. 30.

As shown in FIG. 32, the air cleaner system 240 includes a housing 260 and a cover 264. The housing 260 includes an intake 268 structured to receive fresh air, and a retaining system including two hinge loops 272 and two clasp loops 276. The cover 264 includes two hinge hooks 280 and two clasp hooks 284. The hinge hooks 280 are structured to engage the hinge loops 272 to allow rotation of the cover 264 relative to the housing 260. The clasp hooks 284 are structured to engage the clasp loops 276 to selectively maintain the cover 264 in the closed position. The retaining system allows the cover to be pivoted between the open position (see FIG. 31) and the closed position (see FIG. 32) and maintained in the closed position during engine operation.

Figure 33:
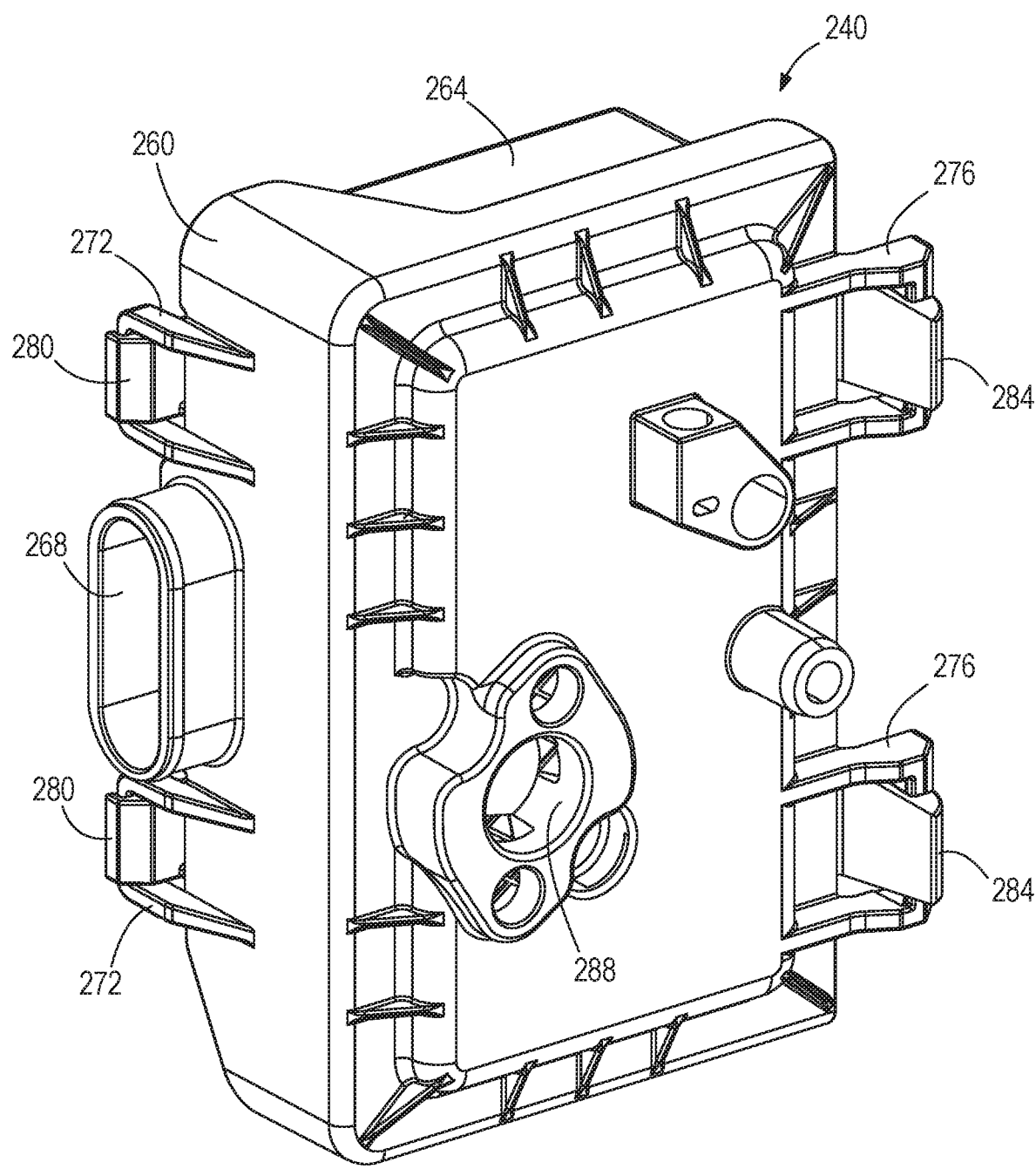
FIG. 33 is a perspective view of the air cleaner system of FIG. 30.
Figure 34:
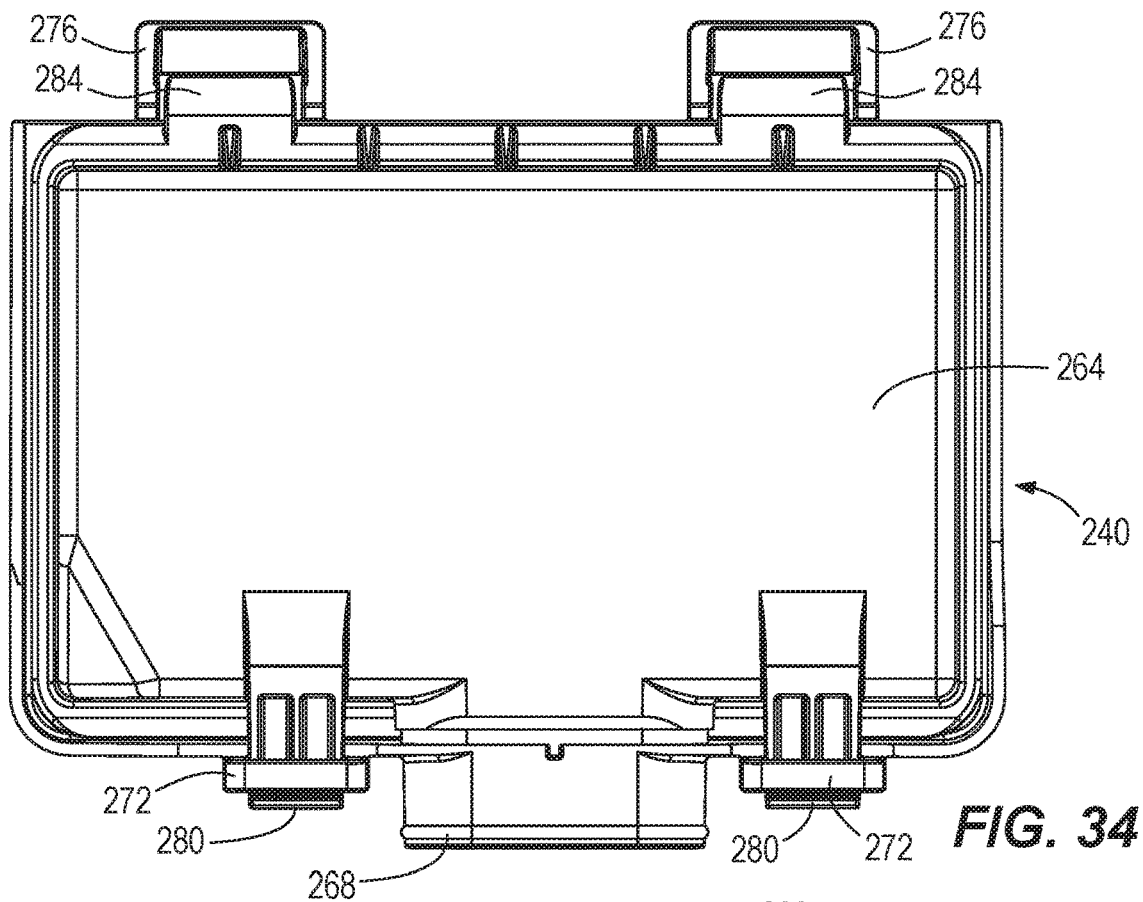
FIG. 34 is a right side view of the air cleaner system of FIG. 30.
Figure 35:
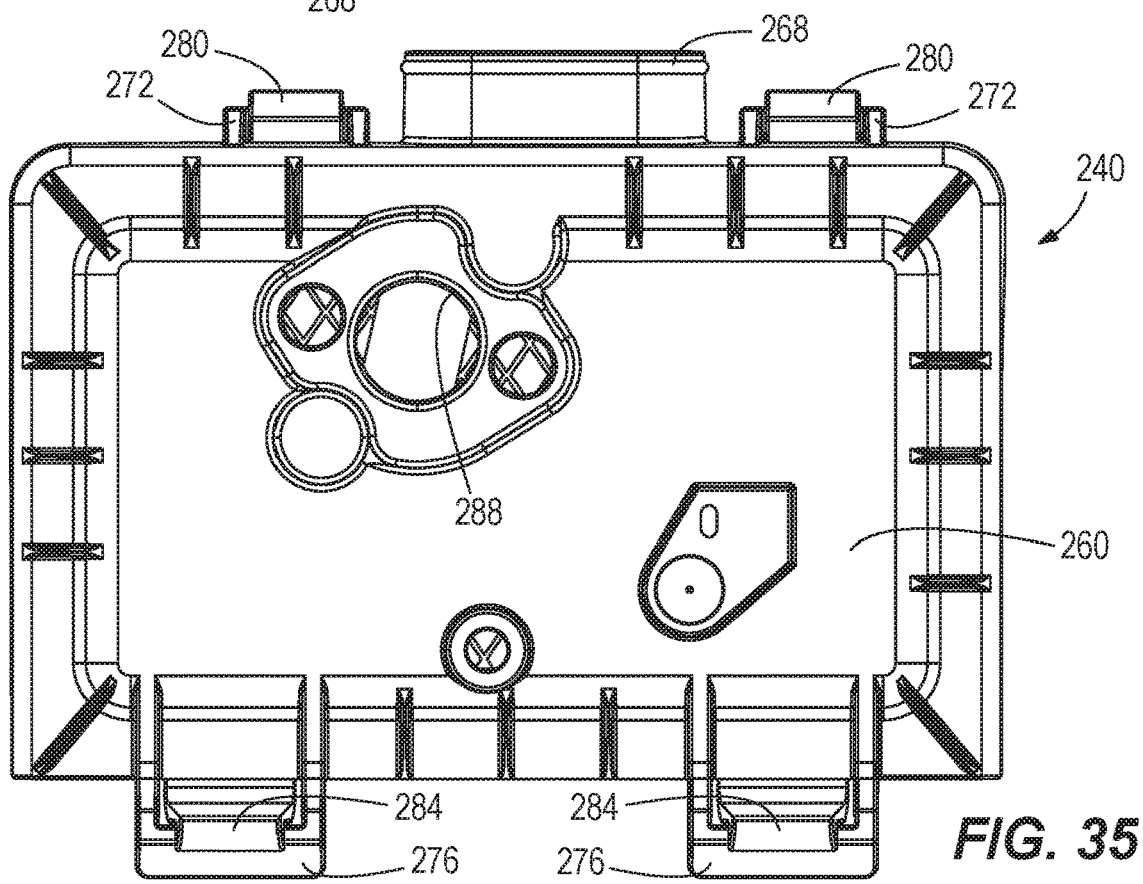
FIG. 35 is a left side view of the air cleaner system of FIG. 30.
Figure 36:
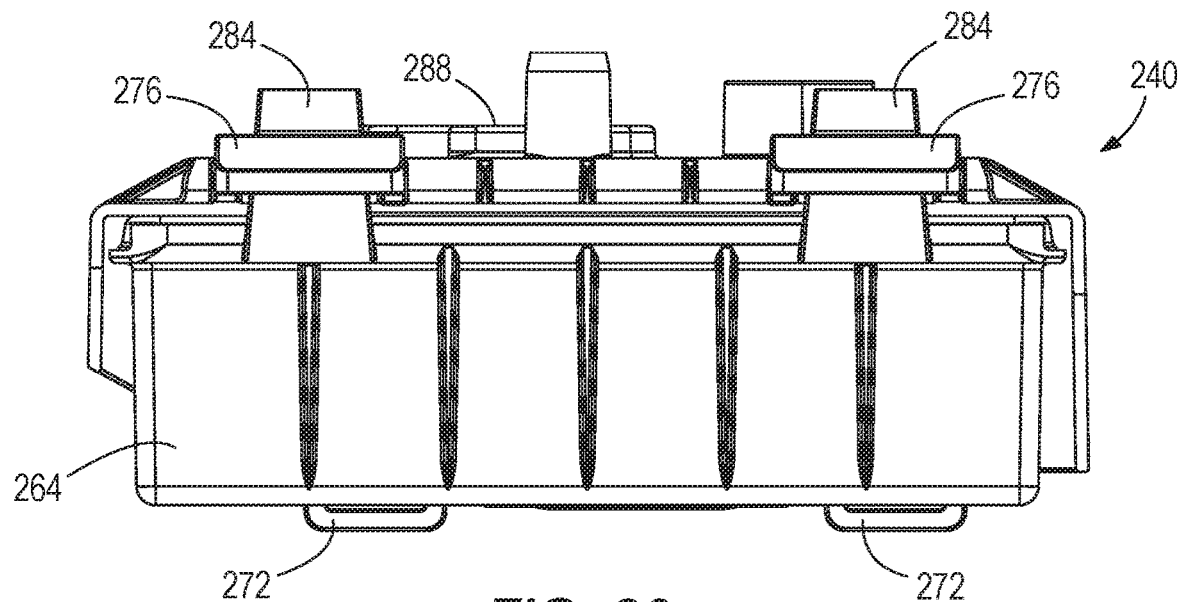
FIG. 36 is a front view of the air cleaner system of FIG. 30.
Figure 37:
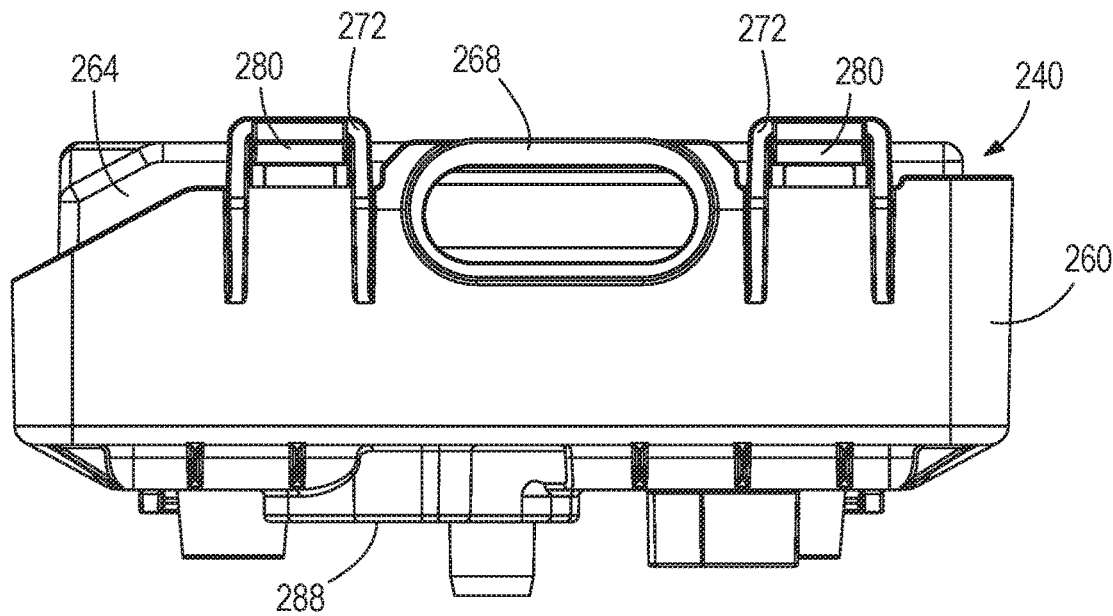
FIG. 37 is a rear view of the air cleaner system of FIG. 30.
Figures 38, 39:
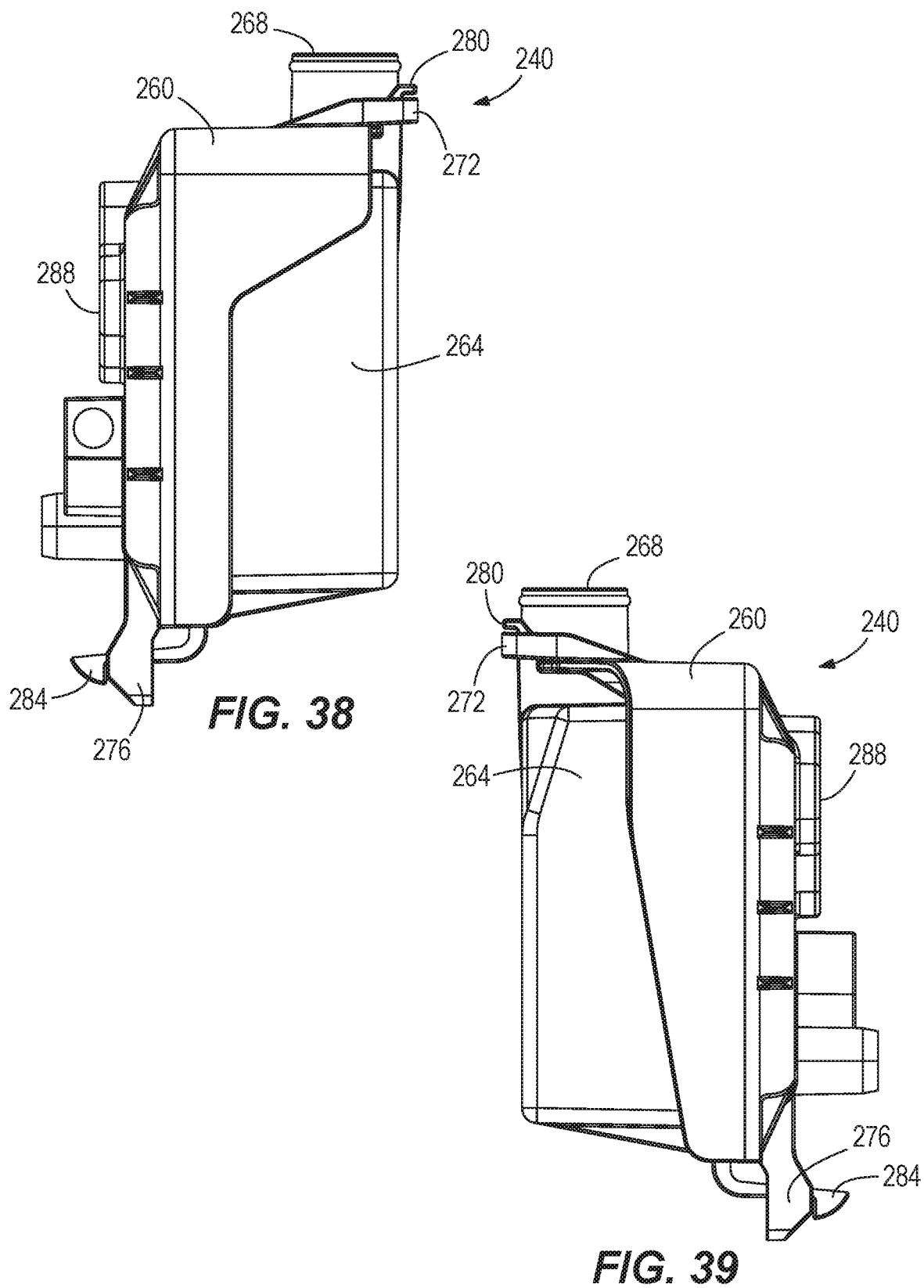
FIG. 38 is a top view of the air cleaner system of FIG. 30.
FIG. 39 is a bottom view of the air cleaner system of FIG. 30.

As shown in FIG. 33, the housing 260 includes an outlet 288 structured to provide filtered fresh air to the fuel handling system 244. FIGS. 34-39 show additional views of the air cleaner assembly 240.

Figure 40:
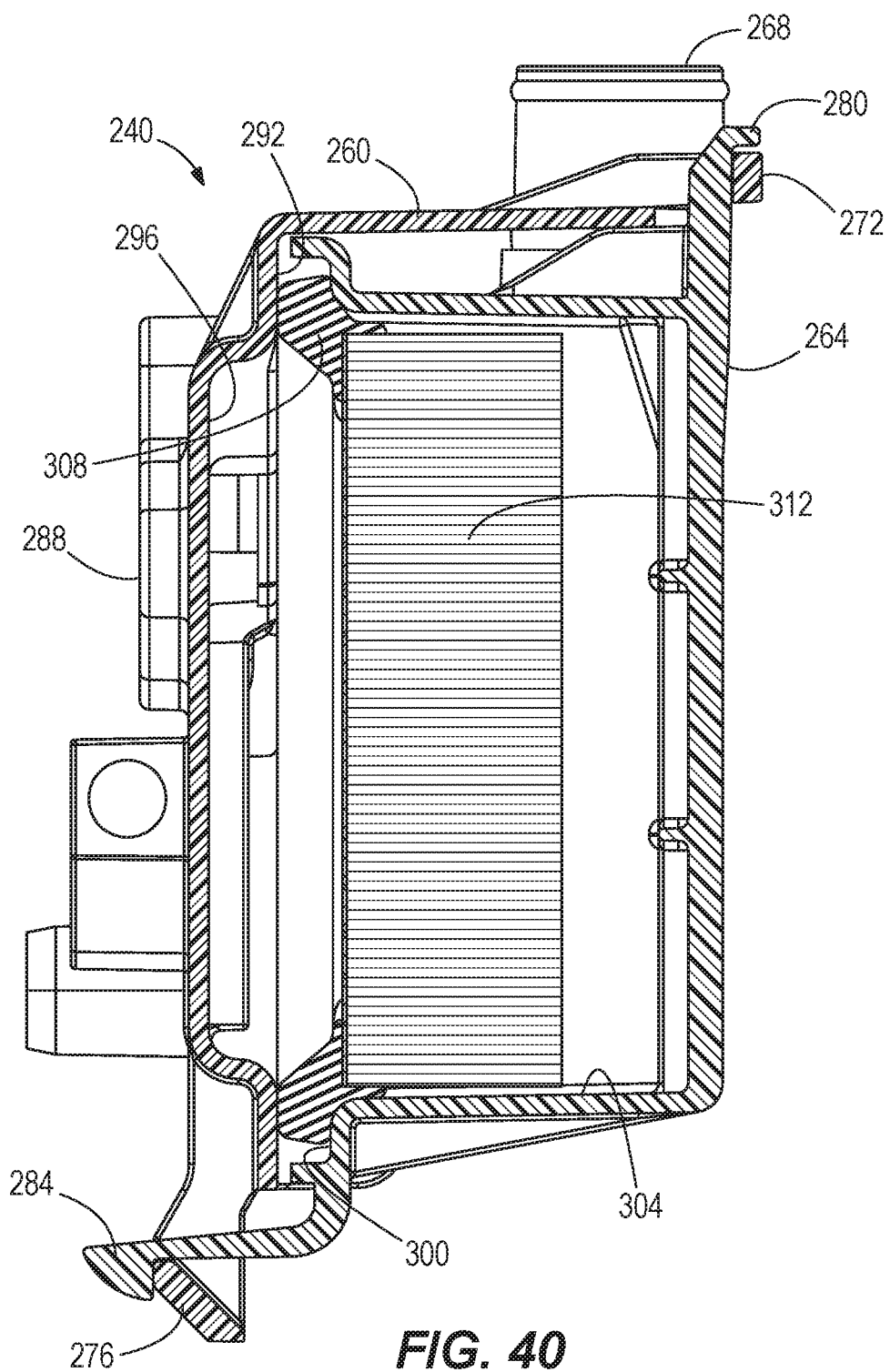
FIG. 40 is a section view of the air cleaner system of FIG. 30 taken along line 40-40 in FIG. 32 showing the air cleaner system in a closed position.

As shown in FIG. 40, the housing 260 defines a sealing seat 292 extending annularly about an outlet cavity 296 arranged between the sealing seat 292 and the outlet 288. The cover 264 defines a carrier in the form of a carrier flange 300 extending annularly about a filter cavity 304 arranged between the carrier flange 300 and the intake 268 when the cover 260 is in the closed position. The carrier flange 300 is sized to receive a filter gasket 308 of a filter element 312. As shown in FIG. 40, when the cover 264 is in the closed position, the filter gasket 308 is captured between the carrier flange 300 and the sealing surface 296 so that all fresh air entering the filter cavity 304 from the intake 268 flows through the filter element 312 before entering the outlet cavity 296 and finally passing to the fuel handling system 244 through the outlet 288.

Figure 41:
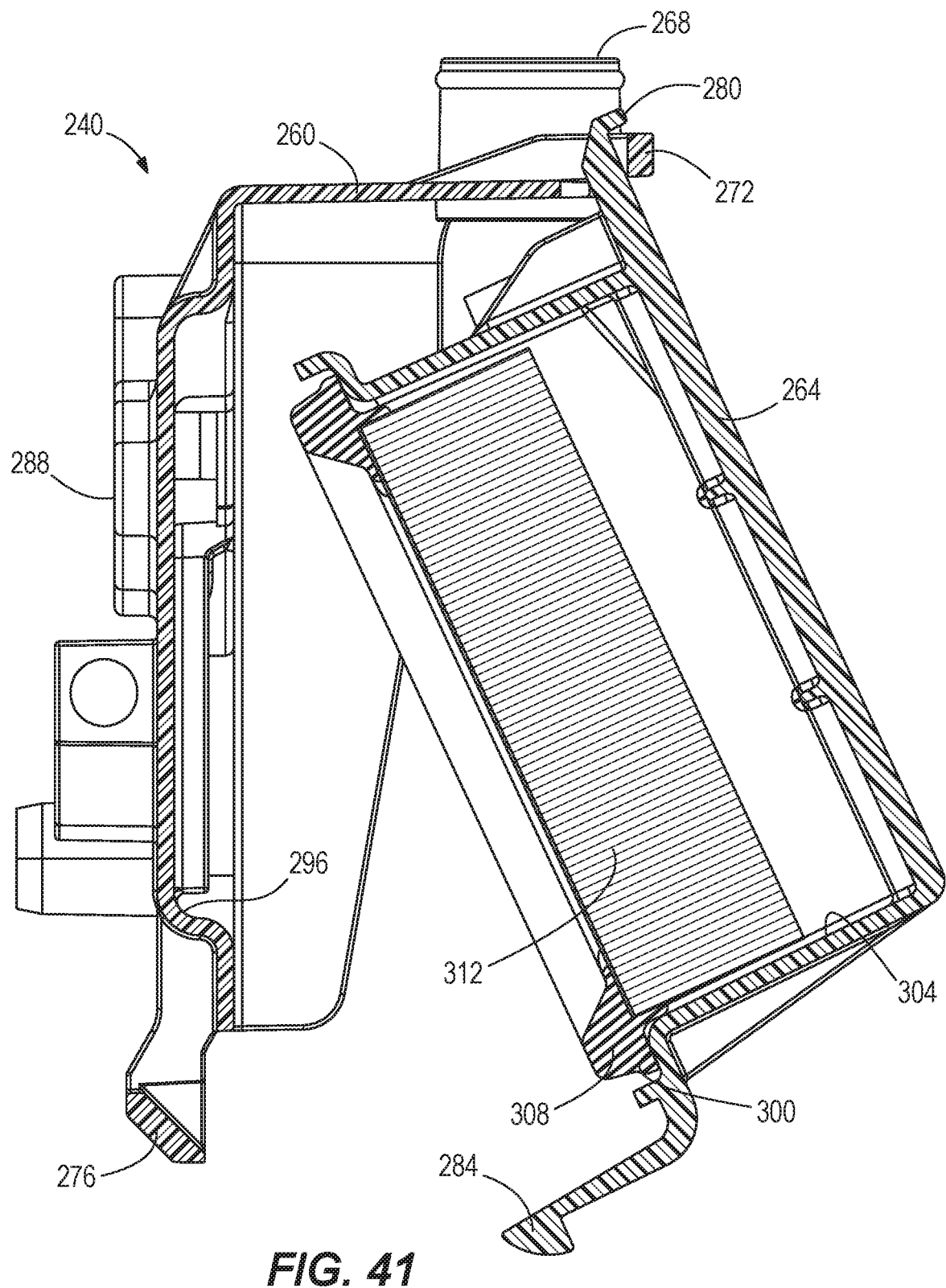
FIG. 41 is a section view of the air cleaner system of FIG. 30 taken along line 40-40 in FIG. 32 showing the air cleaner system in an open position.

As shown in FIG. 41, the filter gasket 308 and the filter element 312 can be replaced by unclasping the clasp hooks 284 from the clasp loops 276 allowing the cover 264 to rotate relative to the housing 260 about the interface between the hinge loops 272 and the hinge hooks 280. With the cover 264 rotated away from the housing 260 a gap is provided toward the front of the air cleaning system 240 for the filter gasket 308 and the filter element 312 to be removed.

A new filter gasket 308 and filter element 312 are inserted into the air cleaner system 240 by initially seating the filter gasket 308 in the carrier flange 300 of the cover 264. The carrier flange 300 is recessed to make location of the filter gasket 308 on the carrier flange 300 easier. With the filter gasket 308 seated in the carrier flange 300, the cover 264 is rotated into the closed position. The clasp hooks 284 are engaged with the clasp loops 276 and the cover 264 is maintained in the closed position and the filter gasket 308 is compressed between the sealing seat 292 and the carrier flange 300.

Figure 42:
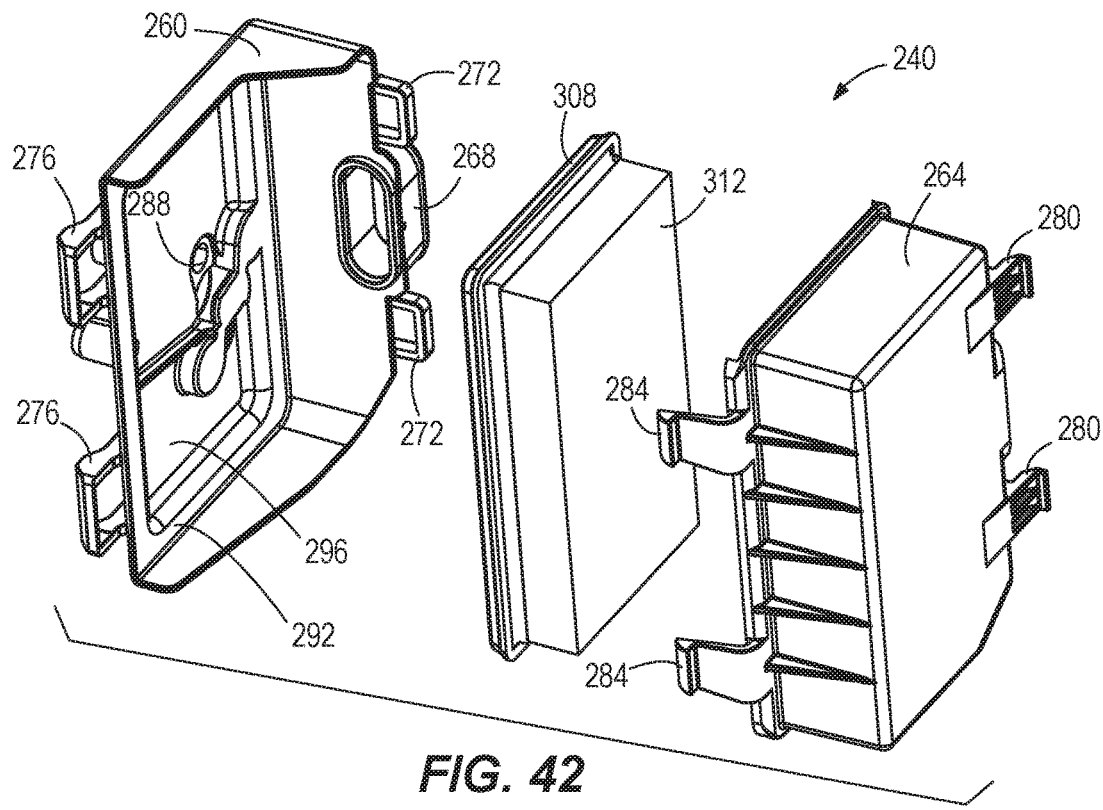
FIG. 42 is an exploded view of the air cleaner system of FIG. 30
Figure 43:
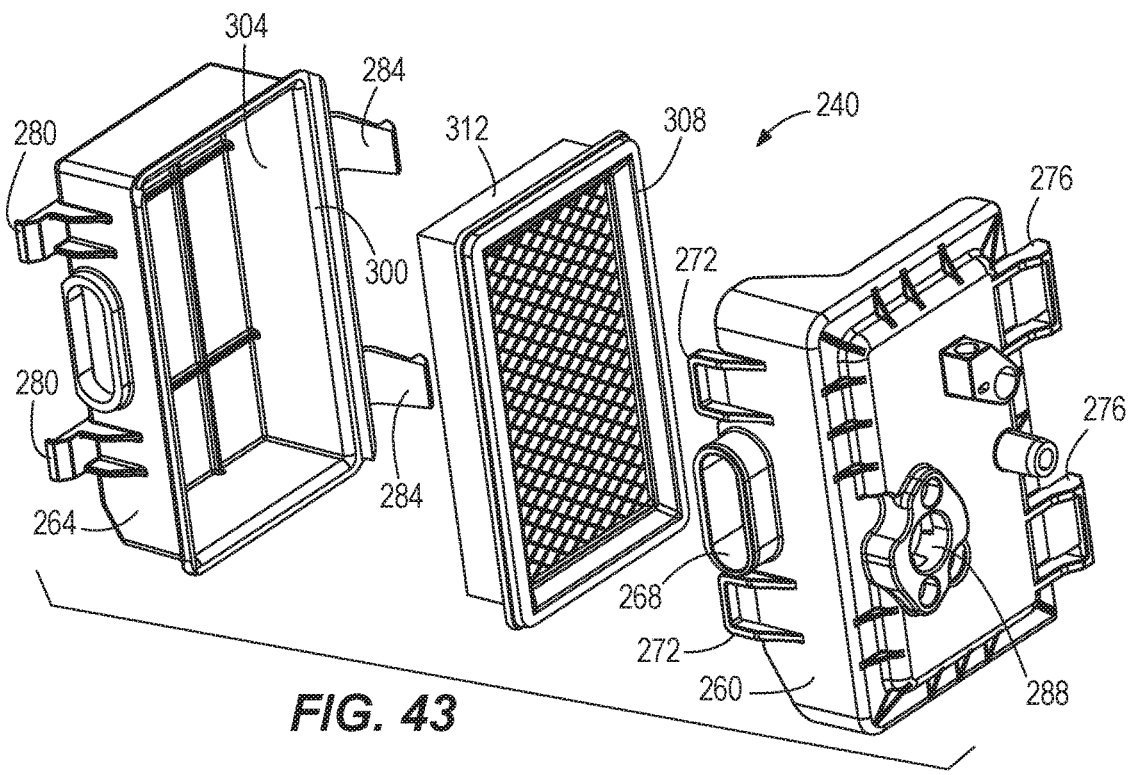
FIG. 43 is an exploded view of the air cleaner system of FIG. 30
Figure 44:
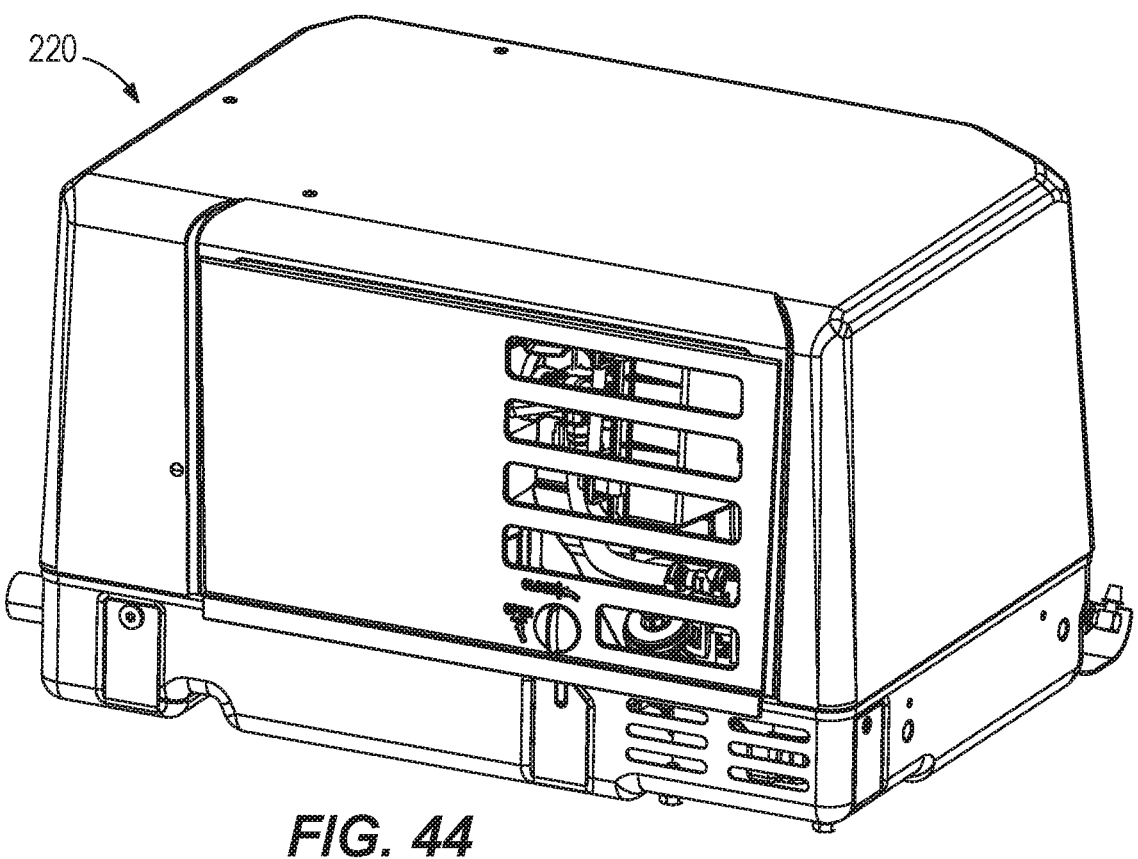
FIG. 44 is a perspective view of the generator set of FIG. 28.
Figure 45:
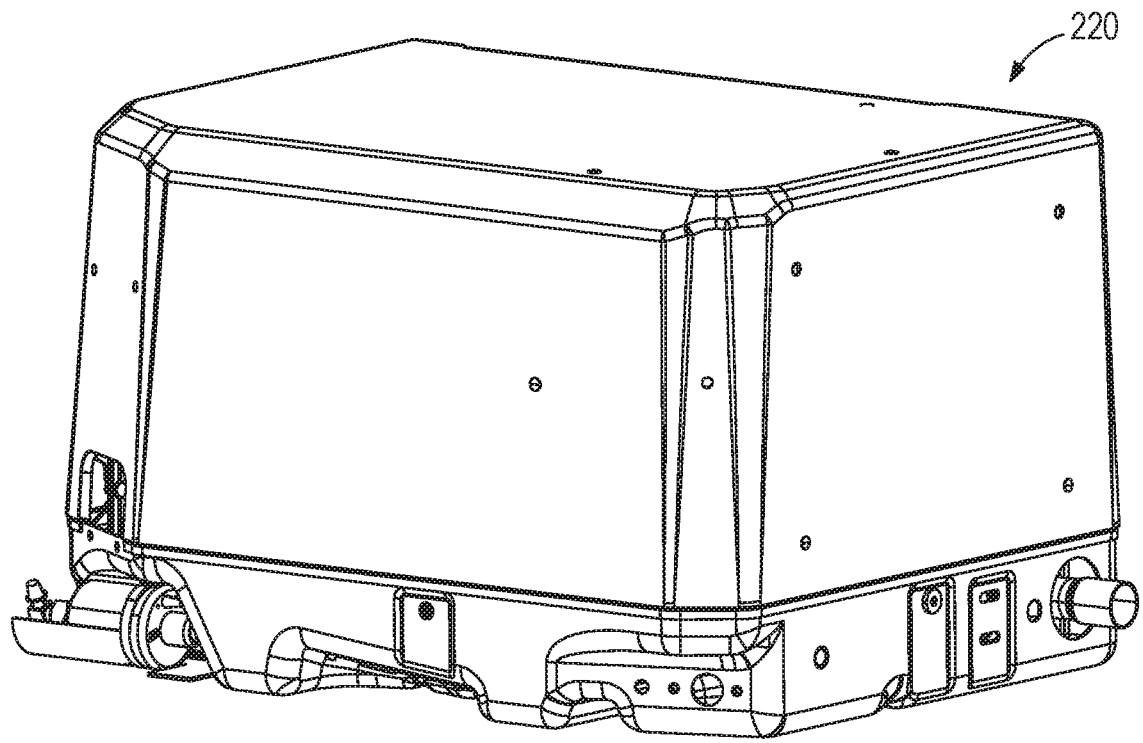
FIG. 45 is a perspective view of the generator set of FIG. 28.
Figure 46:
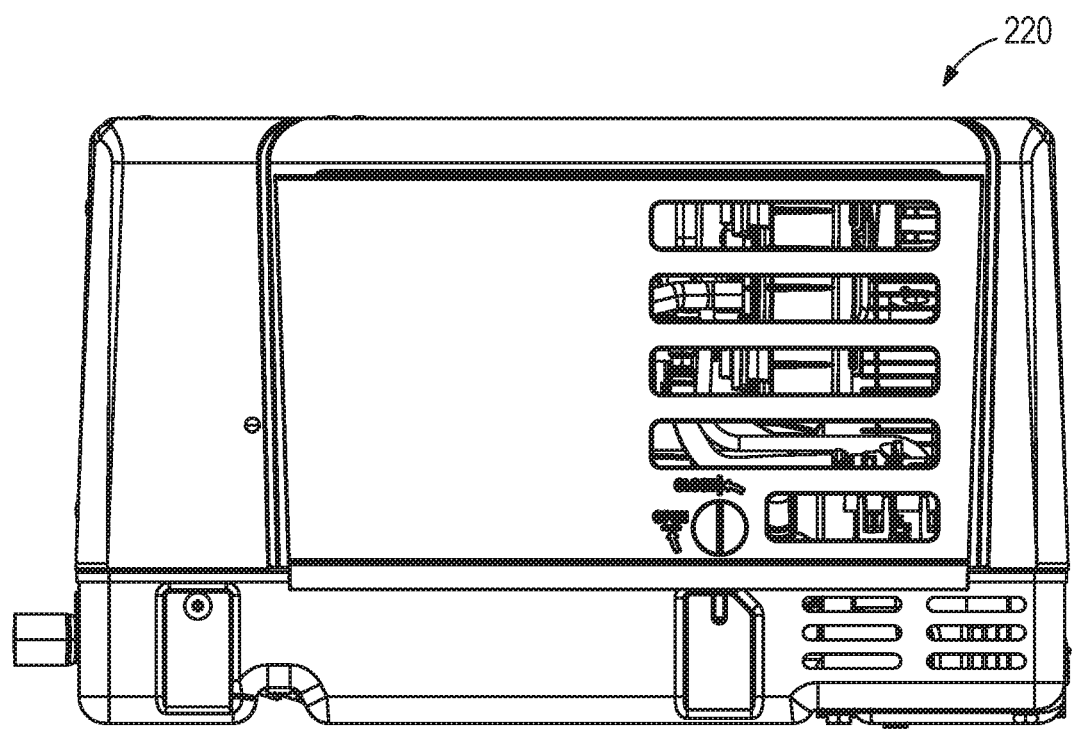
FIG. 46 is a front view of the generator set of FIG. 28.
Figure 47:
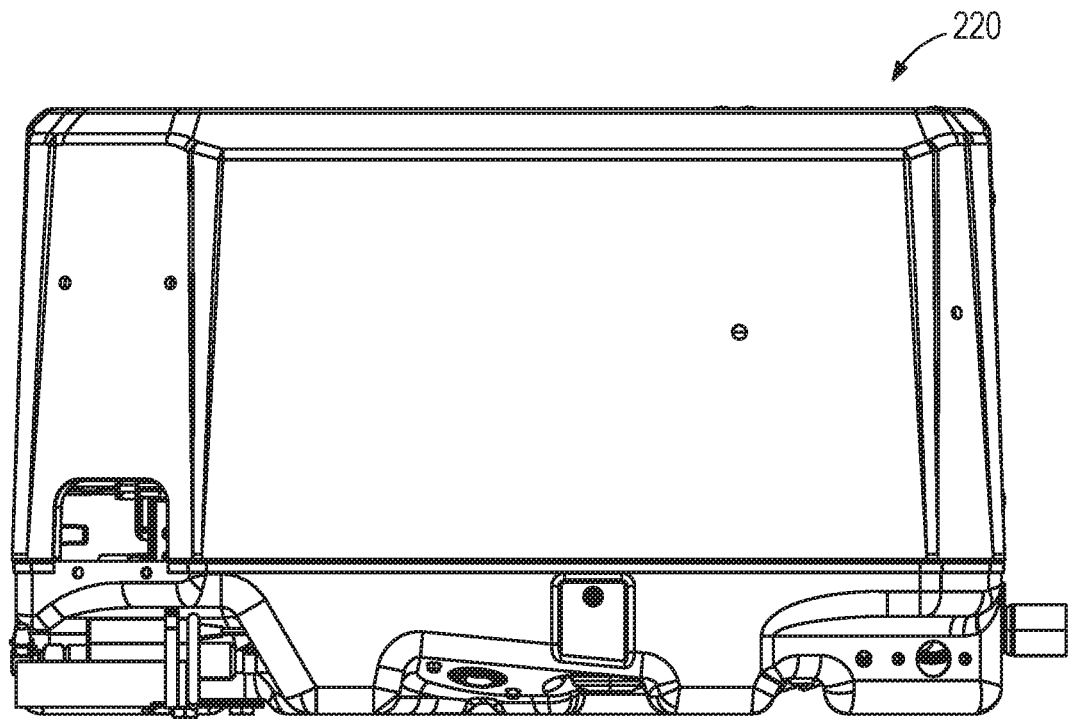
FIG. 47 is a rear view of the generator set of FIG. 28.
Figure 48:
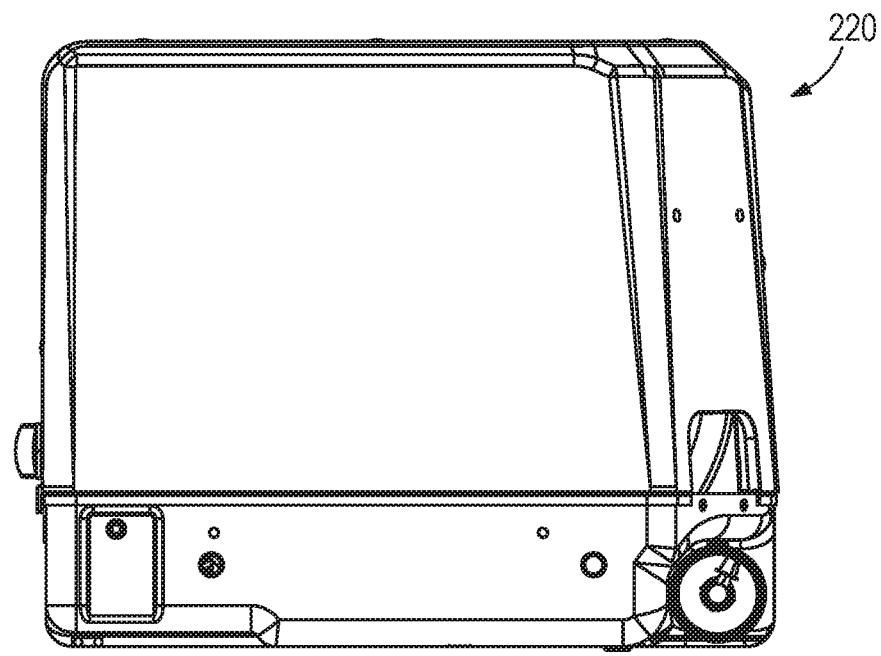
FIG. 48 is a left side view of the generator set of FIG. 28.
Figure 49:
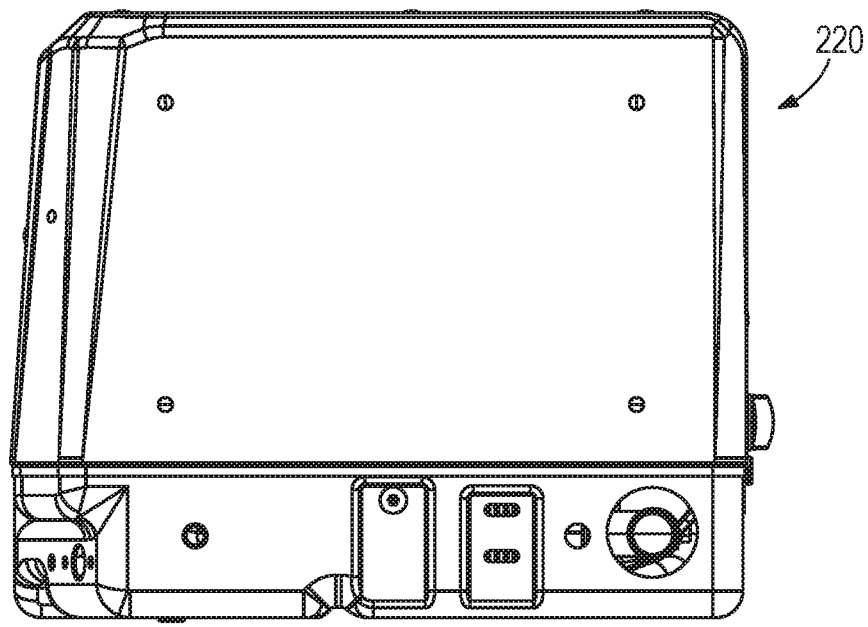
FIG. 49 is a right side view of the generator set of FIG. 28.
Figure 50:
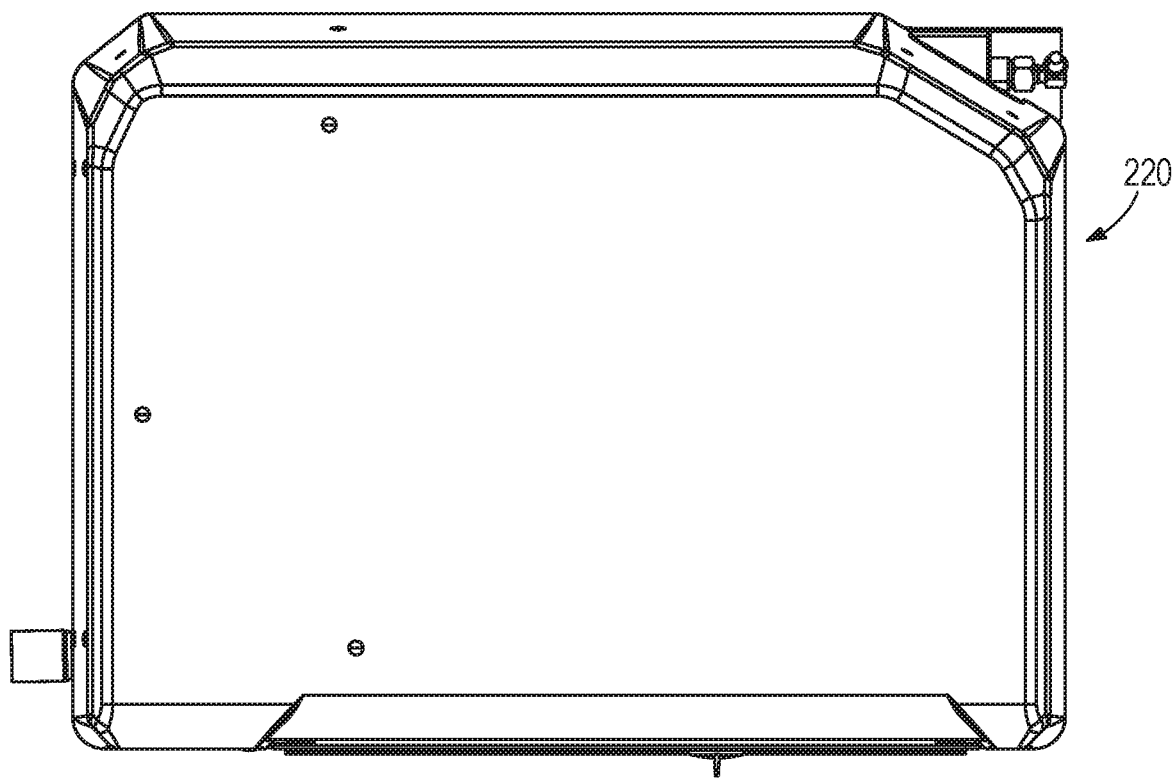
FIG. 50 is a top view of the generator set of FIG. 28.
Figure 51:
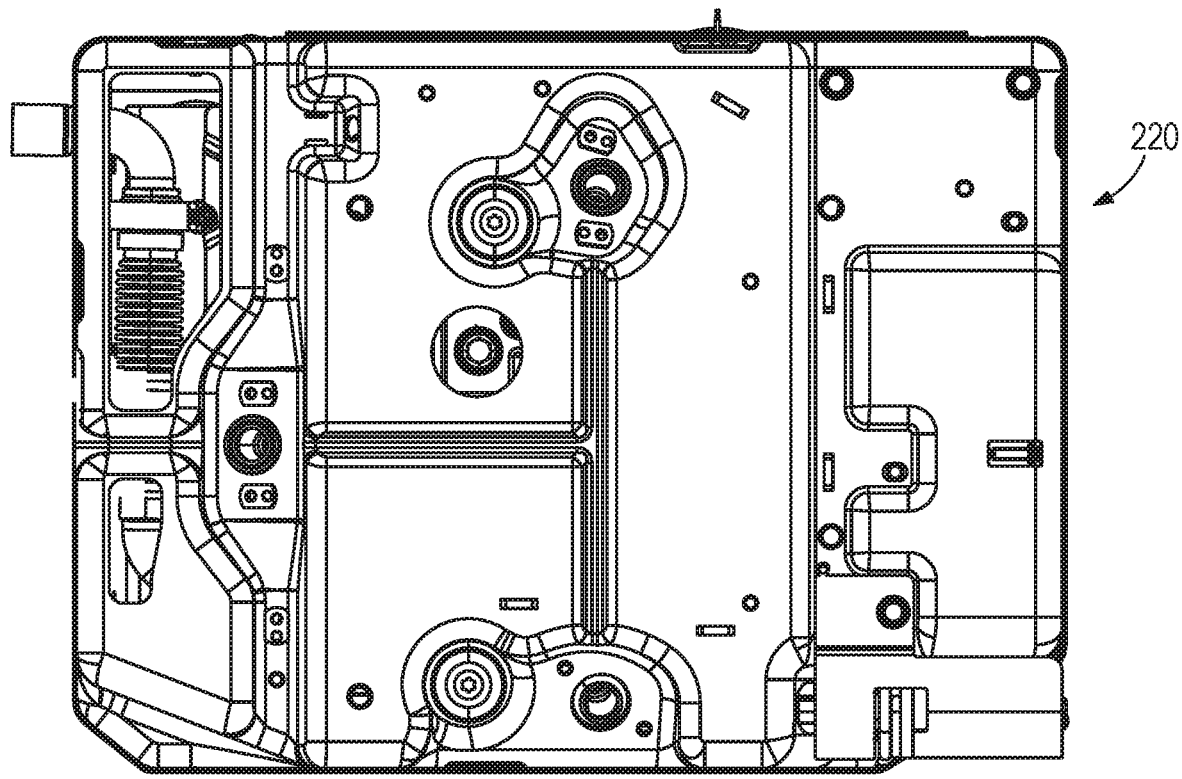
FIG. 51 is a bottom view of the generator set of FIG. 28.

FIGS. 42 and 43 show exploded views of the air cleaner system 240 and make some of the features discussed above more clear. FIGS. 44-51 illustrate the aesthetic design of the assembled generator set 220.

No claim element herein is to be construed under the provisions of 35 U.S.C. § 112(f), unless the element is expressly recited using the phrase "means for."

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that the circuit A communicates directly with circuit B (i.e., no intermediary) or communicates indirectly with circuit B (e.g., through one or more intermediaries).

Although the diagrams herein may show a specific order and composition of method steps, the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. All such modifications are intended to be included within the scope of the present disclosure as defined in the appended claims. Such variations will depend on the hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

While the accompanying drawings illustrate one or more exemplary aesthetic embodiments, it should be understood that according to other exemplary embodiments that should be considered to be within the possession of the inventors of the present application at the time this application is being filed, it is contemplated that any illustrated solid lines (or portions thereof) may be converted to broken lines and that any illustrated broken lines (or portions thereof) may be converted to solid lines so as to claim or disclaim portions, components, or sub-components of the designs shown. The inventors anticipate that the invention can be any part, portion, element, or combination of element of the depicted design. It is further contemplated that shading may be added or removed to claim or disclaim the corresponding surfaces.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A system, comprising:
a housing including an inlet, an outlet structured to couple to an engine, and a sealing seat positioned between the inlet and the outlet; and
a carrier removable from the housing and including a carrier flange structured to receive a filter gasket of a filter element in a direction perpendicular to the carrier flange, the carrier movable between a first position where the carrier flange is positioned adjacent the sealing seat so that the filter gasket is sealed therebetween and air flow between the inlet and the outlet passes through the filter element, and a second position where the carrier flange is spaced from the sealing seat allowing the filter element to be removed.

2. The system of claim 1, wherein the carrier is formed as a piece of a cover.

3. The system of claim 1, wherein the carrier is rotatably coupled to the housing.

4. The system of claim 1, wherein the carrier flange includes a recess sized to receive the filter gasket.

5. The system of claim 1, wherein the housing includes a hinge loop and the carrier is coupled to a cover including a hinge hook sized to engage the hinge loop and provide rotation of the cover relative to the housing.

6. The system of claim 1, wherein the housing includes a clasp loop and the carrier is coupled to a cover including a clasp hook sized to engage the clasp loop to selectively maintain the cover in the first position relative to the housing.

7. The system of claim 1, further comprising the filter element including the filter gasket, and wherein movement toward the second position causes the filter gasket to compress between the sealing seat surrounding the outlet and the carrier flange.

8. The system of claim 1, wherein the sealing seat is planar and annularly surrounds the outlet.

9. A system, comprising:
a housing defining an inlet and an outlet, and a sealing surface positioned between the inlet and the outlet and structured to engage a filter gasket of an air filter; and
a cover pivotably coupled to the housing and including a carrier sized to be received within the housing and including
an air filter receiving feature removable from the housing and structured to support the air filter and position the air filter between the inlet and the outlet, and
a carrier flange structured to receive the filter gasket in a direction perpendicular to the carrier flange and engage the filter gasket between the sealing surface and the carrier flange when the cover is arranged in a closed position.

10. The system of claim 9, wherein the air filter receiving feature includes a recess adjacent the carrier flange.

11. The system of claim 9, wherein the housing includes a hinge loop and the cover includes a hinge hook sized to engage the hinge loop and provide rotation of the cover relative to the housing.

12. The system of claim 9, wherein the housing includes a clasp loop and the cover includes a clasp hook sized to engage the clasp loop to selectively maintain the cover in the first position relative to the housing.

13. The system of claim 9, further comprising the air filter, wherein the air filter includes the filter gasket, and
wherein rotation of the cover toward the closed position causes the filter gasket to compress between the sealing seat surrounding the outlet and the carrier flange.

14. The system of claim 9, wherein the sealing seat is planar and annularly surrounds the outlet.

15. The system of claim 9, wherein the cover defines a filter cavity sized to receive the air filter.

16. The system of claim 9, wherein the cover and the carrier are formed as a single piece.

17. A generator set, comprising:
a chassis;
an engine mounted to the chassis;
an inverter coupled to the engine;
a housing coupled to the chassis, the engine and inverter contained within the chassis and the housing; and
an air cleaner sized to fit within the housing and including
an air cleaner housing defining an inlet and an outlet, and a sealing surface positioned between the inlet and the outlet and structured to engage a filter gasket of an air filter; and
a cover pivotably coupled to the air cleaner housing and including a carrier sized to be received within the air cleaner housing and including
an air filter receiving feature removable from the housing and structured to support the air filter and position the air filter between the inlet and the outlet, and
a carrier flange structured to receive the filter gasket in a direction perpendicular to the carrier flange and engage the filter gasket between the sealing surface and the carrier flange when the cover is arranged in a closed position.

18. The generator set of claim 17, wherein the air filter receiving feature includes a recess adjacent the carrier flange.

19. The generator set of claim 17, wherein the air cleaner housing includes a hinge loop and the cover includes a hinge hook sized to engage the hinge loop and provide rotation of the cover relative to the air cleaner housing, and wherein the air cleaner housing includes a clasp loop and the cover includes a clasp hook sized to engage the clasp loop to selectively maintain the cover in the first position relative to the air cleaner housing.

20. The generator set of claim 17, further comprising the air filter,
    wherein the air filter includes the filter gasket, and
    wherein rotation of the cover toward the closed position causes the filter gasket to compress between the sealing seat surrounding the outlet and the carrier flange.

\* \* \* \* \*